United States Patent
Ha et al.

(10) Patent No.: US 12,474,510 B2
(45) Date of Patent: Nov. 18, 2025

(54) CLOTHES TREATING APPARATUS

(71) Applicant: SAMSUNG ELECTRONICS CO., LTD., Suwon-si (KR)

(72) Inventors: Dohyung Ha, Suwon-si (KR); Jichang Kang, Suwon-si (KR); Youngsun Shin, Suwon-s (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 405 days.

(21) Appl. No.: 18/137,621

(22) Filed: Apr. 21, 2023

(65) Prior Publication Data

US 2023/0400614 A1  Dec. 14, 2023

Related U.S. Application Data

(63) Continuation of application No. PCT/KR2023/003065, filed on Mar. 7, 2023.

(30) Foreign Application Priority Data

Jun. 9, 2022 (KR) .................. 10-2022-0070392

(51) Int. Cl.
   *G02B 5/20* (2006.01)
   *G02B 5/26* (2006.01)
   *D06F 39/14* (2006.01)

(52) U.S. Cl.
   CPC .............. *G02B 5/201* (2013.01); *G02B 5/26* (2013.01); *D06F 39/14* (2013.01)

(58) Field of Classification Search
   CPC ........................................... G02B 5/201
   See application file for complete search history.

(56) References Cited

U.S. PATENT DOCUMENTS

| 7,690,226 B2 | 4/2010 | Son et al. |
| 8,289,472 B2 | 10/2012 | Chung et al. |
| 9,790,637 B2 | 10/2017 | Kim et al. |

(Continued)

FOREIGN PATENT DOCUMENTS

| CN | 102648315 B | 5/2015 |
| CN | 104372575 B | 5/2018 |

(Continued)

OTHER PUBLICATIONS

European Search Report dated Apr. 1, 2025, in European Application No. EP 23 81 9953.

(Continued)

*Primary Examiner* — Jason Y Ko

(74) *Attorney, Agent, or Firm* — STAAS & HALSEY LLP

(57) ABSTRACT

A clothes treating apparatus includes a main body having an inlet port on a front surface of the main body, a tub, and a door rotatably coupled to the main body to open and dose the inlet port. The door includes a door body, a plate that covers a side of the door body, a pattern layer between the plate and the door body and including an optical pattern that transmits at least a portion of light transmitted through the plate, a color layer arranged between the pattern layer and the door body and that transmits at least a portion of light transmitted through the optical pattern, and a reflective layer between the color layer and the door body and that reflects light transmitted through the color layer toward the plate, the reflective layer including an inclined portion extending in a direction that is not parallel to the plate.

15 Claims, 21 Drawing Sheets

(56) References Cited

U.S. PATENT DOCUMENTS

| | | |
|---|---|---|
| 10,590,590 B2 | 3/2020 | Lee et al. |
| 11,265,409 B2 | 3/2022 | Ha et al. |
| 11,384,475 B2 | 7/2022 | Kwon et al. |
| RE49,269 E | 11/2022 | Kwon et al. |
| 2006/0117813 A1 | 6/2006 | Ha et al. |
| 2009/0165391 A1 | 7/2009 | Kocak et al. |
| 2016/0201251 A1 | 7/2016 | Zhang et al. |

FOREIGN PATENT DOCUMENTS

| | | |
|---|---|---|
| CN | 107795970 B | 2/2020 |
| CN | 109423864 B | 3/2021 |
| CN | 112512789 A | 3/2021 |
| EP | 2 184 394 A1 | 5/2010 |
| EP | 3 323 929 A1 | 5/2018 |
| EP | 3 290 567 B1 | 7/2020 |
| EP | 3 690 123 A1 | 8/2020 |
| JP | 2016-529986 | 9/2016 |
| JP | 6906644 | 7/2021 |
| KR | 10-2005-0002430 | 1/2005 |
| KR | 10-0657492 | 12/2006 |
| KR | 10-2007-0060063 | 6/2007 |
| KR | 10-2011-0044043 | 4/2011 |
| KR | 10-2014-0090541 | 7/2014 |
| KR | 10-2015-0053145 | 5/2015 |
| KR | 10-1708352 | 2/2017 |
| KR | 10-1998722 | 7/2019 |
| WO | WO 02/14593 A2 | 2/2002 |

OTHER PUBLICATIONS

International Search Report, PCT/ISA/210, dated Jun. 20, 2023, in PCT Application No. PCT/KR2023/003065.

Written Opinion Report, PCT/ISA/237, dated Jun. 20, 2023, in PCT Application No. PCT/KR2023/003065.

CLOTHES TREATING APPARATUS

CROSS-REFERENCE TO RELATED APPLICATION(S)

This application is a continuation application of International Application PCT/KR2023/003065 filed on Mar. 7, 2023, and is based on and claims priority under 35 U.S.C. 119 to Korean Patent Application No. 10-2022-0070392, filed on Jun. 9, 2022 in the Korean Intellectual Property Office, the disclosures of which are herein incorporated by reference in their entireties.

BACKGROUND

1. Field

The disclosure relates to a clothes treating apparatus, and more particularly, to a clothes treating apparatus capable of providing an optical effect.

2. Description of Related Art

A clothes treating apparatus may include a washing machine in which clothes and detergent put into a tub are rotated together by using a driving force of a motor, so as to wash the clothes by mutual friction, and a clothes dryer that dries an object to be dried in a tub by rotating the tub containing the object.

The clothes treating apparatus includes a main body and a tub rotatably provided inside the main body. An inlet port communicating with the inside of the tub is formed in the main body. A user puts items, such as clothes, laundry, or objects, to be dried through the inlet port.

The clothes treating apparatus further includes a door to open and close the inlet port. The door may be rotatably provided on the main body to open and close the inlet port.

The door may include a transparent material so that a user can see the inside of the tub through the door for the purpose of checking the state of the washing or drying process.

A home appliance may be provided with a light source module configured to emit light to provide convenience or aesthetic feeling to the user. However, as for the home appliance, manufacturing costs may be increased in the process of assembling the light source module inside the product, or additional power may be consumed to operate the light source module.

SUMMARY

In accordance with an aspect of the disclosure, a clothes treating apparatus includes a main body including an inlet port arranged on a front surface of the main body, a tub inside the main body so that items are receivable into an inside of the tub through the inlet port; and a door rotatably coupled to the main body to open and close the inlet port. The door includes a door body, a plate that covers a side of the door body that, when the inlet port is dosed by the door, is a front side of the door body, and provided to transmit light, a pattern layer between the plate and the door body and including an optical pattern that transmits at least a portion of light transmitted through the plate, a color layer between the pattern layer and the door body and that transmits at least a portion of light transmitted through the optical pattern, and a reflective layer between the color layer and the door body and that reflects light transmitted through the color layer toward the plate, the reflective layer including an inclined portion extending in a direction that is not parallel to the plate.

The inclined portion may be inclined so that at least a portion of a surface of the inclined portion facing the color layer faces upward of the door.

At least a portion of the inclined portion is at an upper portion of the door and is inclined so that at least a portion of a surface of the inclined portion facing the color layer faces upward of the door.

Another portion of the inclined portion is at a lower portion of the door and is inclined so that at least a portion of the surface of another portion of the inclined portion facing the color layer faces upward of the door.

The inclined portion may be inclined so that another portion of the surface of the inclined portion facing the color layer faces downward of the door.

The inclined portion may include a first inclined portion and a second inclined portion along an outer circumference of the first inclined portion. The second inclined portion may extend from an end of the first inclined portion in a different direction from the first inclined portion, and extend in a direction that is not parallel to the plate.

The inclined portion may include an inclined surface having a constant inclination angle.

The inclined portion may include a curved inclined surface.

The pattern layer may include a pattern region in which the optical pattern is formed.

An inner edge of the pattern region may be closer than an inner edge of the inclined portion to an outer edge of the door.

The color layer may be between the pattern region and the inclined portion so as to be arranged in front of the inclined portion.

The pattern region may be along an outer edge of the pattern layer.

The optical pattern may include a plurality of holes formed in the pattern region.

The color layer may be parallel to the pattern layer, and the clothes treating apparatus further includes a separation space between the inclined portion and the color layer.

The inclined portion may be along an outer edge of the door in a substantially annular shape.

In accordance with another aspect of the disclosure, a clothes treating apparatus includes a main body and a door rotatably coupled to the main body. The door includes a plate provided to transmit light, a door body including an inner frame provided to support an inside of the door, the door body to which the plate is mounted, the door body in which at least a portion of the inner frame is inclined with respect to an extension direction of the plate, a pattern layer arranged on the plate and including an optical pattern provided to transmit at least a portion of light passing through the plate, a color layer arranged on the plate and provided to transmit at least a portion of light passing through the optical pattern, and a reflective layer provided to reflect light passing through the color layer toward the plate, the reflective layer including an inclined portion provided to be inclined to correspond to the at least a portion of the inner frame, the reflective layer arranged on one side, facing the color layer, of the inner frame.

The pattern layer may be provided on one side, which faces the inner frame, of the plate, and the color layer may be provided on one side of the pattern layer, which faces the inner frame, of the pattern layer.

The at least a portion of the inner frame inclined with respect to the extension direction of the plate may be formed to allow a distance from the plate to be different as the plate is toward a direction of an outer edge of the plate.

The inclined portion may be formed to be inclined with respect to an extension direction of the color layer so as to allow a distance between the inclined portion and the color layer to be different as the inclined portion is toward a direction of an outer edge of the color layer.

The pattern layer may include a pattern region in which the optical pattern is formed, and a blocking region arranged on an inside of a radial direction of the door from the pattern region so as to block light.

The reflective layer may further include an extension portion provided to be bent and extended from one end of the inclined portion and formed in parallel to a rear surface of the plate, and the blocking region may cover at least the extension portion.

A boundary between the pattern region and the blocking region may be arranged on an outside of the radial direction of the door than a boundary between the inclined portion and the extension portion.

In accordance with another aspect of the disclosure, a clothes treating apparatus includes a main body in which a tub is arranged, and a door rotatably provided on the main body to open and close the main body. The door includes a plate provided to transmit light incident from an outside of the door, a pattern layer laminated to a rear surface of the plate in a first direction, the pattern layer including a blocking region provided to block at least a portion of the light passing through the plate, and a pattern region including an optical pattern provided to transmit at least another portion of the light passing through the plate, a color layer provided to transmit light passing through the optical pattern and laminated to a rear surface of the pattern region in the first direction, and a reflective layer arranged in the first direction from the color layer, the reflective layer including an inclined portion in which one side extends in a direction away from the rear surface of the plate, the inclined portion provided to reflect light passing through the color layer toward the plate, the reflective layer including a fixer extending from the inclined portion so as to fix the reflective layer to the plate. The inclined portion is arranged to correspond to the pattern region, and the fixer is arranged to correspond to the blocking region.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

Figure 1:
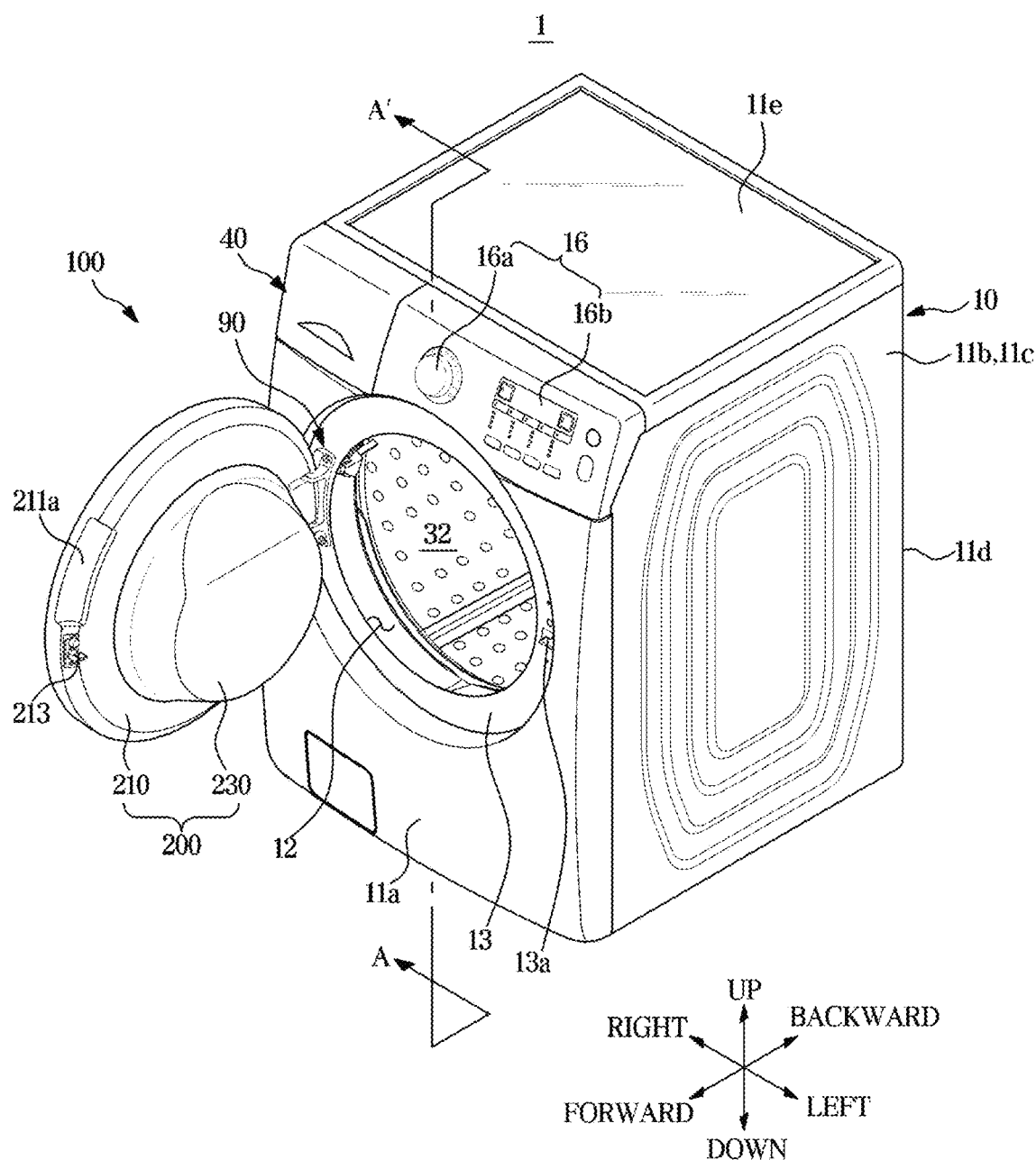
FIG. 1 is a perspective view illustrating a clothes treating apparatus, which is a type of home appliance according to an embodiment of the disclosure.

Embodiments described in the disclosure and configurations illustrated in the drawings are merely examples of the embodiments of the disclosure, and may be modified in various different ways at the time of filing of the present application to replace the embodiments and drawings of the disclosure.

In addition, the same reference numerals or signs illustrated in the drawings of the disclosure indicate elements or components performing substantially the same function.

Also, the terms used herein are used to describe the embodiments and are not intended to limit and/or restrict the disclosure. The singular forms "a," "an" and "the" are intended to include the plural forms as well, unless the context clearly indicates otherwise. In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the disclosure, a first element may be termed as a second element, and a second element may be termed as a first element. The term of "and/or" includes a plurality of combinations of relevant items or any one item among a plurality of relevant items.

In the following detailed description, the terms of "upper", "lower", "front", "rear" and the like may be defined by the drawings, but the shape and the location of the component is not limited by the term.

It is an aspect of the disclosure to provide a clothes treating apparatus including an improved structure to provide a user with an aesthetic feeling, and to improve quality of appearance through optical effects.

It is another aspect of the disclosure to provide a clothes treating apparatus including an improved structure to reduce costs in providing an optical effect.

Additional aspects of the disclosure will be set forth in part in the description which follows and, in part, will be obvious from the description, or may be learned by practice of the disclosure. For example, for convenience of description, terms such as "upper", "lower", "front", and "rear" used in the following description are defined based on a main body 10 of a clothes treating apparatus 1 illustrated in the drawings. In particular, the "front and rear direction" of components rotatable with respect to the main body 10, such as a door 100 or an optical assembly 300, etc., is defined based on the door 100 being in a closed position with respect to the main body 10.

In addition, in the following, for convenience of description, a clothes treating apparatus and a robot cleaner, which are types of home appliances, will be described as examples, but the configuration of the disclosure is not limited thereto and may be applied to various types of home appliances. Hereinafter an example in which an optical assembly according to an embodiment of the disclosure is applied to a door of a front-loading type clothes treating apparatus will be described, but it is merely an example to which the optical assembly according to the disclosure is applied. For example, the optical assembly according to the disclosure may be applied to a configuration, in which a door is arranged in an upper portion of a home appliance, such as a top-loading type clothes treating apparatus, or a configuration such as a panel forming a main body other than a door of a home appliance.

Reference will now be made in detail to embodiments of the disclosure, examples of which are illustrated in the accompanying drawings.

Figure 2:
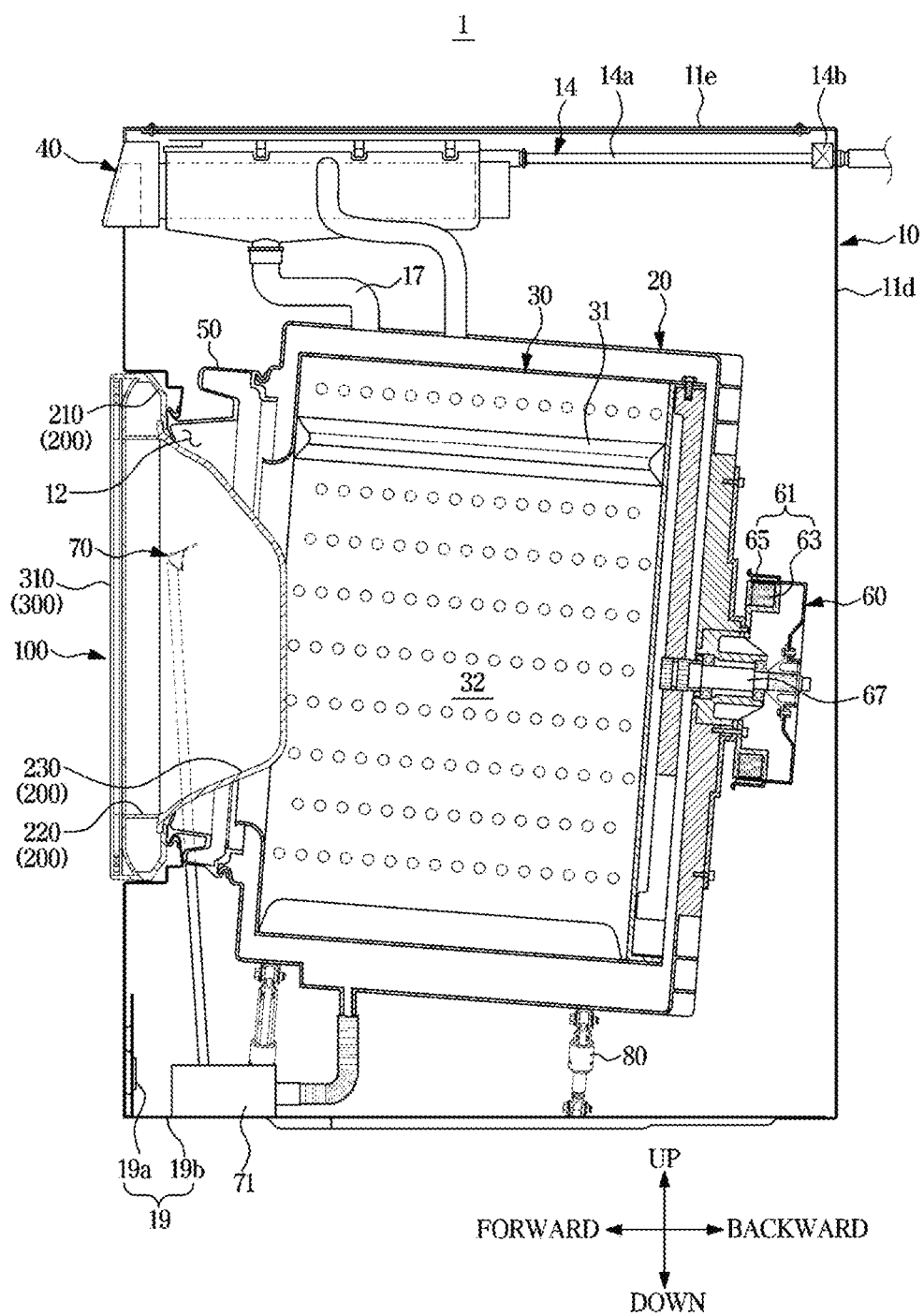
FIG. 2 is a side cross-sectional view of the clothes treating apparatus illustrated in FIG. 1 taken along a line A-A'.

FIG. 1 is a perspective view illustrating a clothes treating apparatus, which is a type of home appliance according to an embodiment of the disclosure. FIG. 2 is a side cross-sectional view of the clothes treating apparatus illustrated in FIG. 1 taken along a line A-A.

Referring to FIGS. 1 and 2, the clothes treating apparatus 1 may include the main body 10 forming an exterior and provided to accommodate various components therein, a tub 20 arranged inside the main body 10 to store mixed water in which wash water and detergent are mixed, a drum 30 arranged inside the tub 20 to store laundry and configured to be rotated, and a driving device 60 configured to rotate the drum 30.

The main body 10 may be formed in a substantially hexahedral shape. The main body 10 may be formed in a box shape with an open front. The main body 10 may include a back plate 11d and both side plates 11b and 11c arranged on one side and the other side in front of the back plate 11d. In an embodiment of the disclosure, the main body 10 is illustrated that the back plate 11d and both side plates 11b and 11c are integrally formed, but the disclosure is not limited thereto. Alternatively, the back plate 11d and both side plates 11b and 11c may be formed in separate components.

The main body 10 may include a front panel 11a provided on the open front side, a base 19 provided on the bottom, and a top cover 11e provided on the top.

A control panel 16 including an inputter 16a configured to receive operation commands from a user and a display 16b provided to display operation information of the clothes treating apparatus 1 may be provided on a front surface of the main body 10.

The base 19 may include a lower frame 19b formed to cover the lower portion of the main body 10 and a lower reinforcing frame 19a extending from the lower frame 19b.

A water supply valve 14b configured to control the water supply, water supply pipes 14a, and a detergent supply device 40 configured to supply detergent into the tub 20 in a water supply process may be installed above the tub 20.

The detergent supply device 40 may be connected to the tub 20 through a detergent supply pipe 17. The wash water supplied through the water supply pipe 14a may be mixed with the detergent via the detergent supply device 40, and the mixed water of the wash water and the detergent may be supplied into the tub 20. Alternatively, the water supply pipe 14a may be directly connected to the inside of the tub 20 through a separate control valve (not shown). In this case, liquid detergent may be supplied into the tub 20 through the detergent supply pipe 17 via the detergent supply device 40.

The driving device 60 may be provided at the rear of the drum 30. The driving device 60 corresponding to a configuration for rotating the drum 30 may transmit a driving force generated by a motor 61 to a rotating shaft so as to rotate the drum 30.

The motor 61 may be composed of a fixed stator 63 and a rotor 65 configured to be rotated by electromagnetically interacting with the stator 63. Accordingly, electrical energy may be converted into kinetic energy, that is, a mechanical rotational force.

The tub 20 may store mixed water in which wash water and detergent are mixed, and may be provided in a substantially cylindrical shape. The tub 20 may be fixed inside the main body 10. An inlet port 12 of the front panel 11a of the main body may be connected to the tub 20 by a diaphragm 50.

A spray nozzle 70 connected to a circulation hose so as to spray the mixed water to the inside of the drum 30 may be provided on one side of the diaphragm 50. The spray nozzle 70 may be provided to evenly spray the mixed water to entire laundry accommodated in the drum 30. The circulation hose may be connected to a circulation pump 71 configured to pump the mixed water stored in the lower portion of the tub 20.

The drum 30 may rotate inside the tub 20 to lift and drop laundry to perform washing the laundry. The drum 30 may be arranged inside the main body 10. The drum 30 may include a receiving space 32 provided to accommodate laundry. A plurality of lifters 31 may be provided inside the drum 30.

A drainage device (not shown) including a drain pipe (not shown) and a drain valve (not shown) for draining water inside the tub 20 may be installed below the tub 20.

The tub 20 is provided to be elastically supported from the main body 10 by an upper spring (not shown) and lower dampers 80. That is, when a vibration generated by the rotation of the drum is transmitted to the tub 20 and the main body 10, the spring (not shown) and the dampers 80 may absorb the vibration energy between the tub 20 and the main body 10 so as to attenuate the vibration transmitted to the main body 10.

The main body 10 may include the inlet port 12 communicating with the inside of the tub 20. Particularly, as illustrated in FIGS. 1 and 2, the inlet port 12 may be formed in the front panel 11a of the main body 10 so as to input laundry into the drum 30. An opening may be formed in the tub 20 and the drum 30 to input laundry or withdraw laundry on the front side of the cabinet, and the opening of the tub 20 and the drum 30 may correspond to the inlet port 12 of the front panel 11a. Accordingly, through the inlet port 12 of the main body 10, a user can insert laundry into or withdraw laundry from the tub 20 and the drum 30 arranged inside the main body 10.

The clothes treating apparatus 1 may include the door 100 rotatably provided on the main body 10 to open and close the inlet port 12. Particularly, the door 100 may be rotatably coupled to the front side of the main body 10 and may be configured to open and close the inlet port 12 provided on the front panel 11a. In addition, the receiving space 32 of the drum 30 may be opened and closed by the door 100.

The clothes treating apparatus 1 may further include a hinge 90 configured to rotatably couple the door 100 to the main body 10. The hinge 90 may be coupled to one side of the door 100 and one side of the main body 10, respectively, so as to connect the door 100 to the main body 10. In other words, the door 100 may be rotatably mounted by the hinge 90.

As illustrated in FIG. 1, the hinge 90 may be coupled to the front panel 11a of the main body 10. The hinge 90 may be coupled to a rear surface of the door 100. Particularly, the hinge 90 may be coupled to a rear surface of an outer frame 210 forming an outer rim (outer edge) of the door 100, and the hinge 90 may be fixed to the main body 10, and the door 100 may be rotatably provided with respect to the hinge 90. Accordingly, the door 100 may be rotatably coupled with respect to the main body 10. However, it is not limited thereto, and the hinge 90 may be configured in various ways as long as the hinge 90 allows the door 100 to be rotatably coupled to the main body 10 to open and close the inlet port 12.

A lever 213 may be provided on the other side of the door 100 that is different from one side of the door 100 coupled to the hinge 90. A lever insertion hole 13a into which the lever 213 is inserted may be formed at a position, which corresponds to the lever 213, in the main body 10. When the door 100 rotates to a position to close the inlet port 12 in the main body 10, the lever 213 may be inserted into the lever insertion hole 13a, and the door 100 may maintain the closed state.

The door 100 may include a handle 211a provided on the outer frame 210 of the door 100. The handle 211a may be formed on a side different from one side of the door 100 coupled to the hinge 90, and may be formed on a side adjacent to the lever 213. A user can manually open and close the door 100 by holding the handle 211a with his/her hand.

FIG. 1 illustrates that the handle 211a has a concave shape on the rear surface of the outer frame 210, but is not limited thereto. Alternatively, the handle 211a may be provided on the front surface of the door 100.

In addition, although the door 100 of the clothes treating apparatus 1 illustrated in FIG. 1 has been described based on the door 100 configured to be manually opened and closed by the handle 211a, but the clothes treating apparatus according to the disclosure does not exclude embodiments in which the door is configured to be automatically opened and closed.

Meanwhile, the direction in which the door 100 rotates with respect to the main body 10 may be different from that illustrated in FIG. 1, and the arrangement of the hinge 90, the lever 213, the lever insertion hole 13a or the handle 211a may also be provided differently from that illustrated in FIG. 1 according to the rotation direction of the door 100.

The main body 10 may include a door mounting member 13 on which the door 100 is mounted. Particularly, the door mounting member 13 may be provided to face the rear surface of the door 100 in a state in which the door 100 is in the closed position with respect to the main body 10, and the door mounting member 13 may be recessed to allow at least a portion of the door 100 to be received and seated thereon. For example, as illustrated in FIG. 1, as the door 100 is rotatably coupled to the front of the main body 10, the door mounting member 13 may be formed on the front panel 11a of the main body 10, and the door mounting member 13 may include a shape that is concavely recessed toward the rear of the main body 10.

The door mounting member 13 may have a shape corresponding to the outer surface of the door 100 and may be provided in a ring shape formed along an outer circumference of the inlet port 12.

The hinge 90 may be coupled to the door mounting member 13. In addition, the lever insertion hole 13a may be formed in the door mounting member 13. In addition, the handle 211a formed on the rear surface of the outer frame 210 of the door 100 may be provided to face the door mounting member 13 when the door 100 closes the inlet port 12.

Because the door mounting member 13 is arranged on the main body 10, the door 100 may be stably supported by the door mounting member 13 in the state in which the door 10 is in the closed position with respect to the main body 10. In addition, as the rear surface of the door 100 is mounted on the door mounting member 13, it is possible to prevent wash water inside the tub 20 and the drum 30 from being leaked to the outside of the clothes treating apparatus 1 through the inlet port 12 in the closed state of the door 100.

However, the configuration of the clothes treating apparatus 1 described above with reference to FIGS. 1 and 2 is merely an example for describing the clothes treating apparatus according to the disclosure, and the clothes treating apparatus 1 may be provided to include various components to perform functions such as washing and driving laundry.

For example, the driving methods of the tub 20 and the drum 30 for washing or drying functions of the clothes treating apparatus 1, and the water supply and drainage, and detergent supply methods are not limited to the examples described above.

In addition, FIGS. 1 and 2 illustrate that the clothes treating apparatus 1 is the front-loading type in which the door 100 is rotatably provided on the front surface of the main body 10, but the disclosure is not limited thereto. Accordingly, the clothes treating apparatus according to the disclosure may be applied to a top-loading type clothes treating apparatus.

However, the following description will be described based on the front-loading type clothes treating apparatus 1 according to an embodiment of the disclosure.

Figure 3:
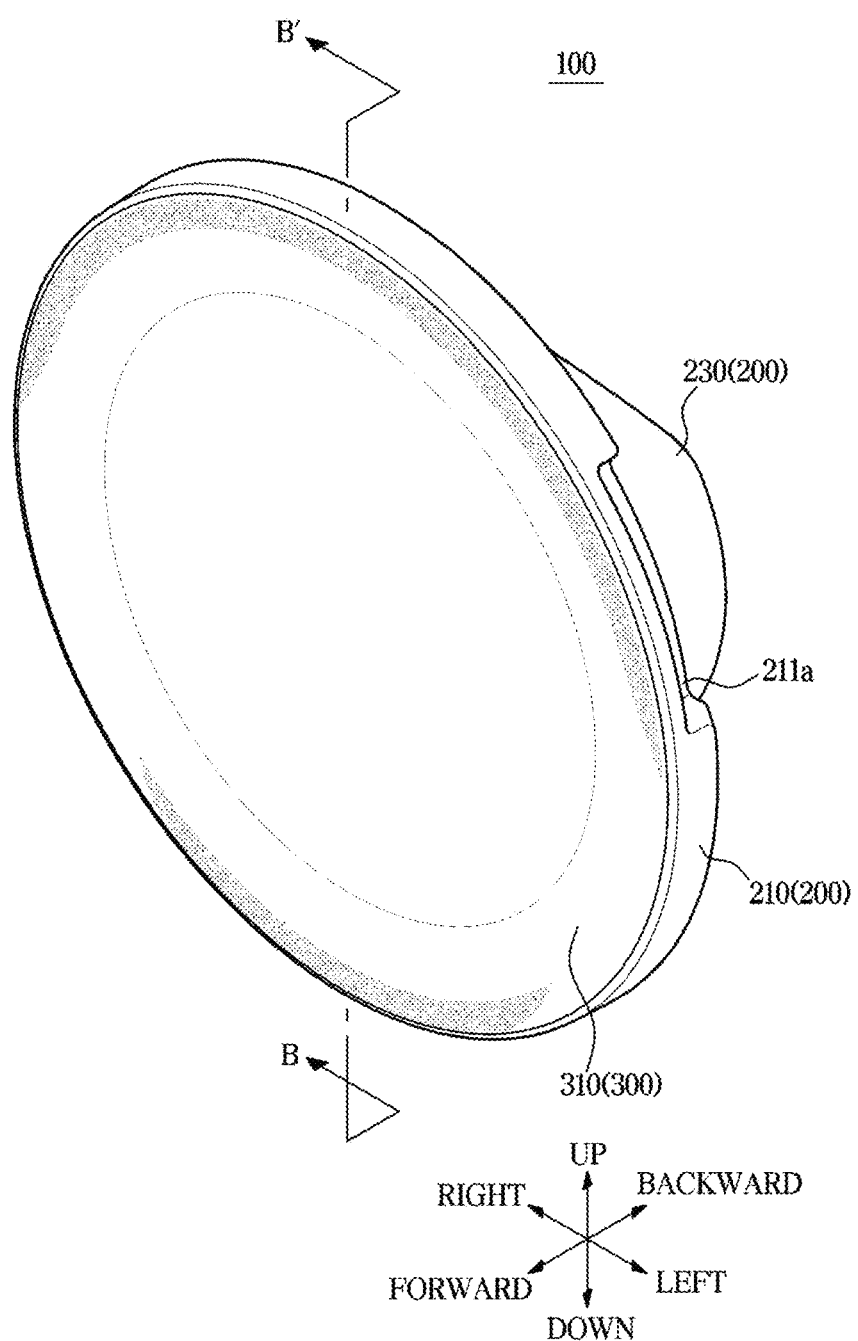
FIG. 3 is a perspective view illustrating a door of the clothes treating apparatus illustrated in FIG. 1.
Figure 4:
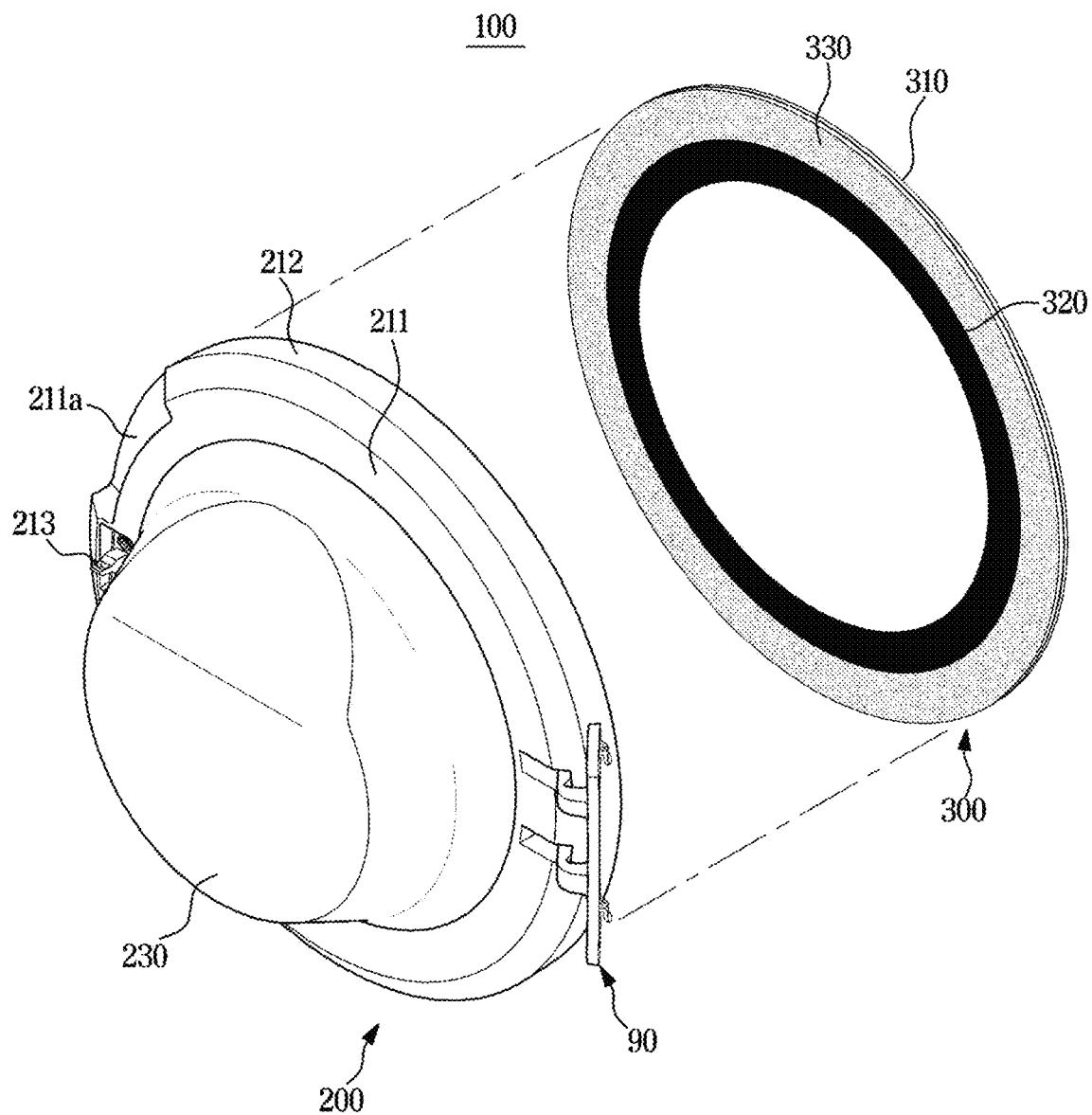
FIG. 4 is a rear view illustrating a plate disassembled from the door of FIG. 3.
Figure 5:
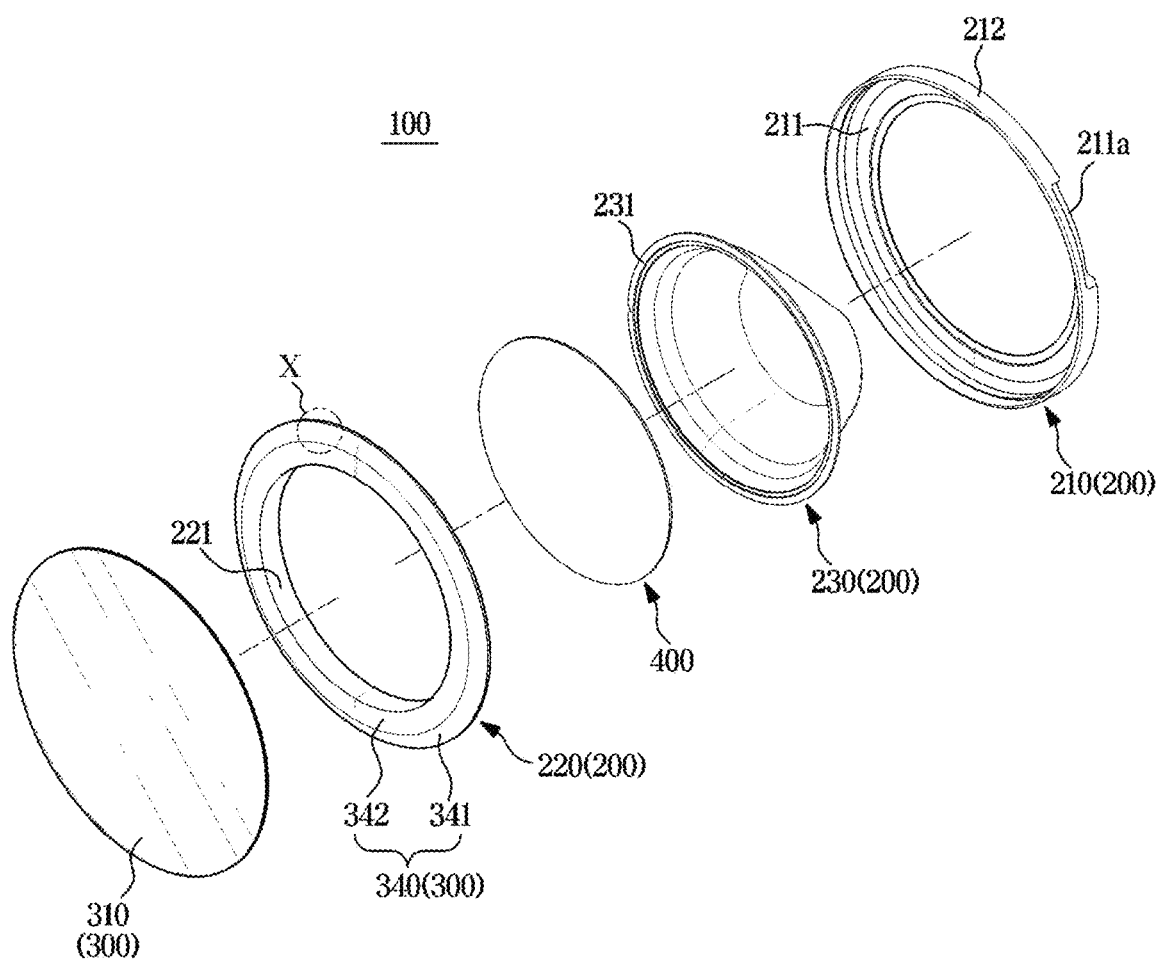
FIG. 5 is an exploded-perspective view of the door of FIG. 3.
Figure 6:
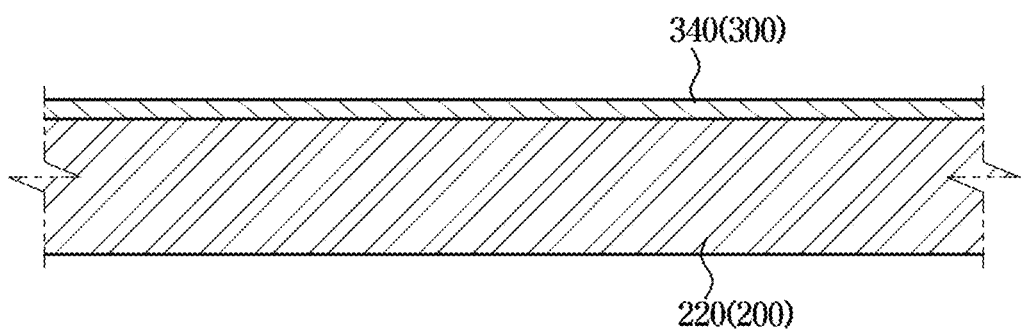
FIG. 6 is an enlarged-view schematically illustrating a part X of FIG. 5.

FIG. 3 is a perspective view illustrating a door of the clothes treating apparatus illustrated in FIG. 1. FIG. 4 is a rear view illustrating a plate disassembled from the door of FIG. 3. FIG. 5 is an exploded perspective view of the door of FIG. 3. FIG. 6 is an enlarged view schematically illustrating a part X of FIG. 5.

Hereinafter in describing components included in the door 100, such as a door body 200 and an optical assembly 300 to be described later, directions such as "front", "rear", "up", "down" of each component are defined and described based on the state in which the door 100 is in the closed position with respect to the main body 10, for convenience of description.

Referring to FIGS. 3 to 6, the door 100 may include a door body 200 and a plate 310 covering one side of the door body 200. The door body 200 may form an exterior of the door 100 or support the inside of the door 100. The plate 310 may cover the front of the door body 200 and form the exterior of the door 100. The plate 310 may be included in the optical assembly 300 to be described later. In other words, the plate 310 may be mounted on the door body 200 and may form a portion of the outer surface of the door 100.

The plate 310 may cover one side of the door body 200 to form an exterior of one side of the door 100. Particularly, "one side" of the door 100 or the door body 200 may refer to the "front side" of the door 100 in a state in which the door 100 is in the closed position with respect to the main body 10. That is, the plate 310 may form a front exterior (front surface) of the door 100.

However, even though the plate 310 forms the exterior of one side of the door 100 as described above, the disclosure does not exclude a case in which another configuration is provided in front of the plate 310. For example, a component (e.g., a protective film, etc.) for protecting the plate 310 may be provided in front of the plate 310, but even this case may be included in a case in which the plate 310 forms the exterior of the door 100.

The plate 310 may be provided to transmit light. That is, the plate 310 may include a transparent material. Accordingly, a user can not only look inside the tub 20 through the plate 310, but also an optical effect produced by the optical assembly 300 of the door 100 may be provided to the user.

In the disclosure, an expression "the plate 310 is provided to transmit light" is not limited to a case in which light, which is incident to the plate 310 from the inside or outside of the clothes treating apparatus 1, is completely transmitted through the plate 310, but may include a case in which, even when at least a portion of the light incident on one side of the plate 310 is reflected, absorbed, refracted, or scattered by the plate 310, at least another portion of the light is transmitted through the plate 310 and then exits to the other surface of the plate 310.

In addition, the above expression may not mean that all of the plate 310 is provided to transmit light, but may include a case in which a portion of the plate 310 is provided to transmit light. Further, a color forming the plate 310 may not be limited to the disclosure.

The plate 310 may be provided to include a transparent glass material, but is not limited thereto. Alternatively, the plate 310 may be provided to include various materials through the injection molding using a transparent resin, or through a method of cutting and processing a plate formed of a transparent resin.

The plate 310 may be formed to have a substantially flat plate shape. Particularly, the plate 310 may be formed in a plate shape with flat front and rear surfaces. In this case, a manufacturing time and manufacturing cost may be reduced in comparison with a case in which at least one surface of the plate 310 has a curved shape. However, it is not limited thereto, and at least one surface of the plate 310 may have a curved shape. For example, at least a portion of the front surface of the plate 310 may have a curved shape.

The door 100 may include a pattern layer 320 and a color layer 330. As illustrated in FIG. 4, the pattern layer 320 and the color layer 330 may be arranged at rear of the plate 310. In other words, the pattern layer 320 may be arranged between the plate 310 and the door body 200, and the color layer 330 may be arranged between the pattern layer 320 and the door body 200.

As illustrated in FIG. 4, the pattern layer 320 and the color layer 330 may be provided on the plate 310. Particularly, the pattern layer 320 may be provided on one side, facing an inner frame 220, of the plate 310, and the color layer 330 may be provided on one side, facing the inner frame 220, of the pattern layer 320.

The pattern layer 320 and the color layer 330 may be components included in the optical assembly 300.

The pattern layer 320 may include an optical pattern 321 provided to transmit at least a portion of the light transmitted through the plate 310. In other words, the pattern layer 320 may allow at least a portion of the light transmitted through the plate 310 to pass through the optical pattern 321 (refer to FIG. 8), and prevent at least another portion of the light transmitted through the plate 310 from being transmitted through the pattern layer 320. That is, the pattern layer 320 may be provided to allow a pattern, which is formed by selectively transmitting and blocking of light, to appear on one surface of the door 100. The configuration of the pattern layer 320 may vary according to a shape of a pattern to appear on the door 100.

The color layer 330 may be provided to transmit at least a portion of light transmitted through the optical pattern 321 of the pattern layer 320. The color layer 330 may impart a color to light incident on the color layer 330 among light transmitted through the plate 310 and the pattern layer 320 or light reflected by a reflective layer 340 described later. The color imparted to the light may correspond to an inherent color of the color layer 330. When the light transmitted through the plate 310 and the pattern layer 320 is white light, the light transmitted through the color layer 330 may have the same color as or at least a similar color to the inherent color of the color layer 330. In other words, a wavelength of the light may change while the light passes through the color layer 330.

The pattern layer 320 and the color layer 330 may be provided along the outer edge of the door 100 (hereinafter referred to as 'outer rim' for convenience of description). In other words, the pattern layer 320 and the color layer 330 may be formed in a substantially annular shape to be arranged along the outer rim of the plate 310. In addition, as described later, the reflective layer 340 may also be formed in a substantially annular shape to correspond thereto. Due to the shapes of the plate 310, the pattern layer 320, the color layer 330, and the reflective layer 340, the optical effect provided by the optical assembly 300 may appear substantially annular along the outer rim of the plate 310. However, it is not limited thereto, and the shapes of the pattern layer 320, the color layer 330, and the reflective layer 340 may vary according to the shape of the door 100, and characteristics of optical effects to be provided.

As illustrated in FIG. 4, the pattern layer 320 and the color layer 330 may be integrally provided on one surface of the plate 310. For example, the pattern layer 320 may be printed on the rear surface of the plate 310. Further, the color layer 330 may be printed on the rear surface of the pattern layer 320. Particularly, the color layer 330 may be printed on the rear surface of the pattern layer 320 to cover at least the optical pattern 321 of the pattern layer 320. However, it is not limited thereto, and the pattern layer 320 and the color layer 330 may be provided in various ways by various manufacturing methods, and may not be integrally provided on the plate 310.

A specific configuration of the optical assembly 300 including the pattern layer 320 and the color layer 330 will be described later.

The door body 200 may include the outer frame 210. The outer frame 210 may be arranged behind the optical plate 310 and may form the rear surface of the door 100.

Particularly, the outer frame 210 may include a rear portion 211 forming a rear surface of the outer frame 210 and a side portion 212 forming a side surface of the outer frame 210. The lever 213 or handle 211a may be provided on the rear portion 211, and the hinge 90 may be coupled to the rear portion 211, but is not limited thereto.

The outer frame 210 may be provided to support a side surface of the plate 310. Particularly, the side portion 212 of the outer frame 210 may support the side surface of the plate 310. In other words, the side portion 212 may be arranged along the outer circumference of the plate 310.

As the plate 310 is fixed to the side portion 212 of the outer frame 210, the plate 310 may be stably coupled to the door body 200. For example, the plate 310 may be fixed to the side portion 212 of the outer frame 210 through an adhesive or the like. However, it is not limited thereto, and as will be described later, the plate 310 may be coupled to the door body 200 as the plate 310 is adhered to the inner frame 220 by an adhesive 350 (refer to FIG. 8).

The outer frame 210 may support the side surface of the plate 310 but may not come into contact with the front surface of the plate 310. Accordingly, the front surface of the plate 310 may be fully exposed in the front direction of the door 100. Accordingly, because the front surface of the plate 310 is not covered by the door body 200 including the outer frame 210, quality of appearance of the product may be improved. However, it is not limited thereto, and, for example, the outer frame 210 may include a front portion (not shown) that is bent and extended from the side portion 212 to cover the front edge of the plate 310, thereby supporting the front surface of the plate 310.

The outer frame 210 may be formed in a substantially annular shape, but is not limited thereto and the outer frame 210 may be provided in various shapes.

The door body 200 may include a rear cover 230 coupled to the outer frame 210 and forming a rear portion of the door 100.

The rear cover 230 may have a shape protruding rearward of the door 100. In other words, the rear cover 230 may have a protruding shape to be inserted into the main body 10 through the inlet port 12 in the state in which the door 100 is in the closed position with respect to the main body 10. In accordance with the shape of the rear cover 230, the front surface of the rear cover 230 may have a shape that is concavely recessed rearward of the door 100. However, it is not limited thereto, and the rear cover 230 may be provided to have various shapes.

The rear cover 230 may include an edge member 231 arranged between the inner frame 220 and the outer frame 210. The edge member 231 may be arranged and fixed between the front of the outer frame 210 and the rear of the inner frame 220. Particularly, the edge member 231 may be arranged between a rear extension 221 of the inner frame 220 and the rear portion 211 of the outer frame 210, and thus the edge member 231 may be fixed by the inner frame 220 and the outer frame 210. However, it is not limited thereto, and the rear cover 230 may be fixed to the inner frame 220 or the outer frame 210 in various ways.

The rear cover 230 may be provided to transmit light. That is, the rear cover 230 may include a transparent material. Accordingly, a user can look into the inside of the tub 20 through the plate 310 and the rear cover 230.

In the disclosure, an expression "the rear cover 230 is provided to transmit light" is not limited to a case in which light, which is incident to the rear cover 230 from the inside or outside of the clothes treating apparatus 1, is completely transmitted through the rear cover 230, but may include a case in which even when at least a portion of the light incident on one side of the rear cover 230 is reflected, absorbed, refracted, or scattered by the rear cover 230, at least another portion of the light is transmitted through the rear cover 230 and then exits to the other surface of the rear cover 230.

In addition, the above expression may not mean that all of the rear cover 230 is provided to transmit light, but may include a case in which a portion of the rear cover 230 is provided to transmit light. Further, a color forming the rear cover 230 may not be limited to the disclosure.

The rear cover 230 may include various materials such as a transparent glass material and a transparent resin material.

The door body 200 may include the inner frame 220 arranged inside the door 100. The inner frame 220 may be arranged between the plate 310 and the outer frame 210. In other words, the inner frame 220 may be arranged behind the plate 310 and may be arranged in front of the rear portion 211 of the outer frame 210. The side portion 212 of the outer frame 210 may be arranged in a lateral direction of the inner frame 220. The inner frame 220 may support components of the door 100 such as the outer frame 210, the rear cover 230, the plate 310, and a middle plate 400 described later, from the inside of the door 100. In other words, the inner frame 220 may support the inside of the door 100.

The inner frame 220 may include a front portion (reference numeral not indicated) provided with the reflective layer 340 that is provided on one side, facing the rear surface, of the plate 310, and the rear extension 221 extending from the front portion of the inner frame 220 to the rear of the door 100. The rear extension 221 may be bent from the front portion of the inner frame 220 and extend toward the rear of the door 100.

The reflective layer 340 included in the optical assembly 300 may be provided on one side of the inner frame 220. Particularly, the reflective layer 340 may cover the front surface of the inner frame 220. The reflective layer 340 may be arranged between the color layer 330 and the door body 200 (particularly, the inner frame 220), and may be provided to reflect light, which is transmitted through the color layer 330, toward the plate 310.

The inner frame 220 may be formed to have a substantially annular shape provided along the outer rim of the door 100. Particularly, when the pattern layer 320 and the color layer 330 are arranged along the outer rim of the door 100, the inner frame 220 may be provided to have a shape corresponding to the pattern layer 320 and the color layer 330.

Because the reflective layer 340 is arranged on the front portion of the inner frame 220, an optical effect provided by the optical assembly 300 may appear in a substantially annular shape along the outer rim of the door 100.

As described later, the reflective layer 340 may be provided on one surface, facing the color layer 330, of the inner frame 220, and because the reflective layer 340 includes an inclined portion 341, at least portion of the inner frame 220 may have a shape corresponding to the inclined portion 341.

In other words, at least a portion of the inner frame 220 may be inclined with respect to a direction in which the plate 310 extends. In addition, the inclined portion 341 may be inclined to correspond to at least a portion of the inner frame 220.

In other words, at least a portion of the inner frame 220, in which the inclined portion 341 is provided on one side facing the color layer 330, may be formed to be inclined with respect to the extension direction of the plate 310, or the radial direction of the plate 310, or the radial direction of the door 100.

Particularly, at least a portion of the inner frame 220 formed to be inclined with respect to the extension direction of the plate 310 may be formed to allow a distance from the plate 310 to be different as the at least a portion is toward a direction of the outer edge of the plate 310.

A specific feature of configuration such as the inclined portion 341 will be described later.

However, it is not limited thereto, and the shape of the inner frame 220 is not limited thereto.

For example, as described above, the shapes of the pattern layer 320, the color layer 330, and the reflective layer 340 may vary according to the shape of the door 100, and characteristics of optical effects to be provided. Further, the inner frame 220 on which the reflective layer 340 is arranged in the front portion may also have various shapes.

In addition, even when the inner frame 220 is formed to correspond to a shape of the door 100 such as an annular shape along the outer rim of the door 100, the reflective layer 340 may provide various optical effects because the reflective layer 340 is formed in a portion of one side of the inner frame 220. That is, it is not required that the reflective layer 340 has a shape corresponding to one surface of the inner frame 220, in particular, the front surface of the inner frame 220.

The door 100 may further include the middle plate 400 received by the door body 200 and arranged between the plate 310 and the rear cover 230.

The middle plate 400 may be provided to transmit light. That is, the middle plate 400 may include a transparent material. Accordingly, a user can look inside the tub 20 sequentially passing through the plate 310, the middle plate 400, and the rear cover 230.

In the disclosure, an expression "the middle plate 400 is provided to transmit light" is not limited to a case in which light, which is incident to the middle plate 400 from the inside or outside of the clothes treating apparatus 1, is completely transmitted through the middle plate 400, but may include a case in which even when at least a portion of the light incident on one side of the middle plate 400 is reflected, absorbed, refracted, or scattered by the middle plate 400, at least another portion of the light is transmitted through the middle plate 400 and then exits to the other surface of the middle plate 400.

In addition, the above expression may not mean that all of the middle plate 400 is provided to transmit light, but may include a case in which a portion of the middle plate 400 is provided to transmit light. Further, a color forming the middle plate 400 may not be limited to the disclosure.

The middle plate 400 may be provided to include a transparent glass material, but is not limited thereto. Alternatively, the middle plate 400 may be provided to include various materials through the injection molding using a transparent resin, or through a method of cutting and processing a plate formed of a transparent resin.

The middle plate 400 may be formed to have a substantially flat plate shape. Particularly, the middle plate 400 may be formed in a plate shape with flat front and rear surfaces. In this case, a manufacturing time and manufacturing cost may be reduced in comparison with a case in which at least one surface of the middle plate 400 has a curved shape. However, it is not limited thereto, and at least one surface of the middle plate 400 may have a curved shape. For example, at least a portion of the rear surface of the middle plate 400 may have a curved shape.

Figure 7:
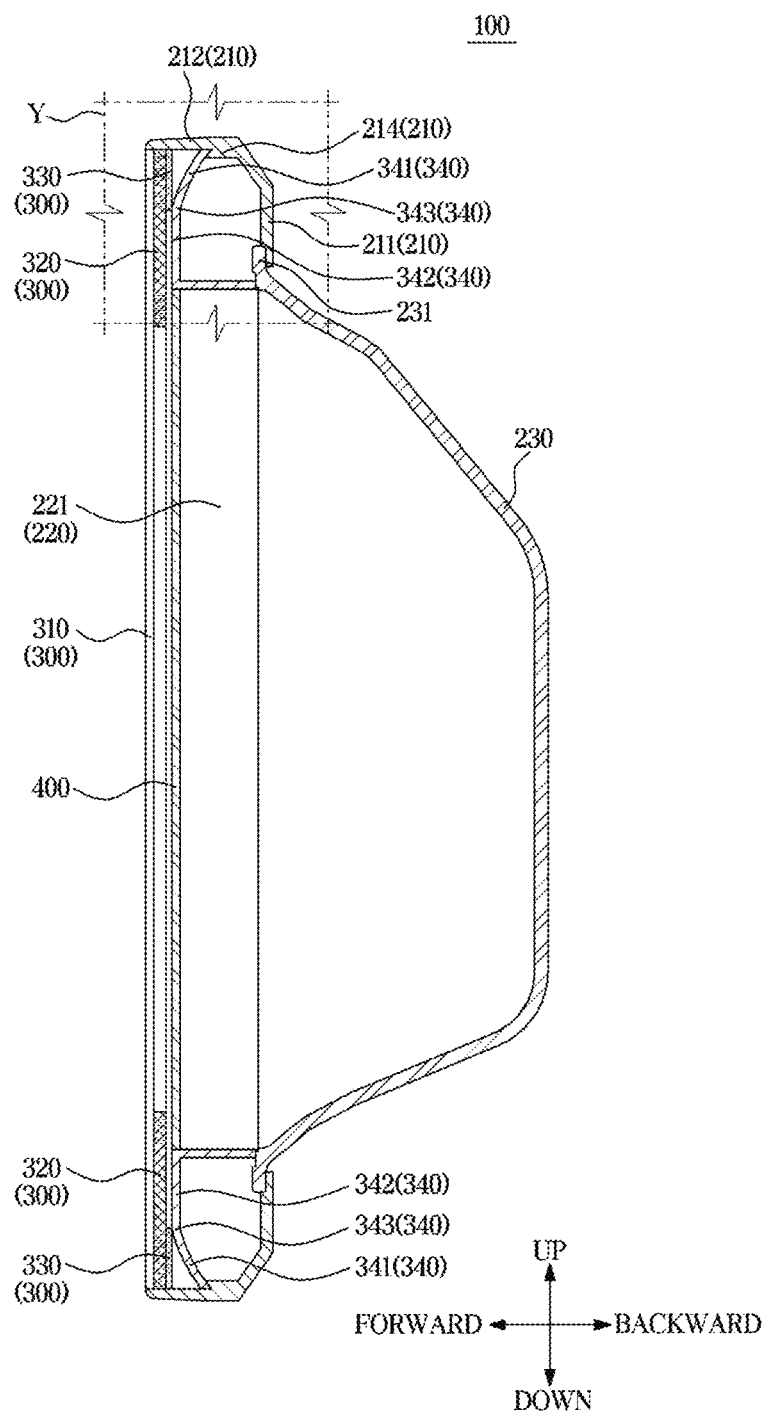
FIG. 7 is a side cross-sectional view of the door of FIG. 3 taken along a line B-B'.

The middle plate 400 may be supported by the inner frame 220 (refer to FIG. 7). Particularly, a side surface of the middle plate 400 may be supported by the inner frame 220. The rear extension 221 of the inner frame 220 may be arranged along an outer circumference of the middle plate 400 to fix the middle plate 400. However, it is not limited thereto, and the middle plate 400 may be fixed to the door body 200 in various ways.

The door 100 may include the reflective layer 340. Referring to FIG. 6, the reflective layer 340 may be provided in the form of a thin layer arranged on one side of the inner frame 220. Particularly, the reflective layer 340 may be arranged between the plate 310 and the inner frame 220.

The reflective layer 340 may include a material having high reflectivity. Accordingly, at least a portion of light, which is incident on one side of the plate 310 and transmitted through the pattern layer 310 and the color layer 330, may be reflected by the reflective layer 340 and travel toward the plate 310 again.

The reflective layer 340 may be provided to cover one surface of the inner frame 220, and in other words, one surface of the inner frame 220 may be coated with the reflective layer 340. For example, the reflective layer 340 may be formed by plating one surface of the inner frame 220 with a metal material having high reflectivity (e.g., chromium (Cr)). However, it is not limited thereto, and a specific material or coating method of the reflective layer 340 may be provided in various ways.

As described later, the reflective layer 340 may include the inclined portion 341 and an extension portion (or fixer) 342. Between the inclined portion 341 and the extension portion 342, a portion provided to reflect light to provide an optical effect may correspond to the inclined portion 341. Therefore, although the reflective layer 340 is described below as a configuration including the inclined portion 341 and the extension portion 342, only the inclined portion 341 may be coated with a material having high reflectivity because the portion, in which the light reflection actually occurs, is the inclined portion 341.

However, as for the reflective layer 340, the extension portion 342 in which the light reflection hardly occurs may be also coated with a material having high reflectivity. This is because coating the entire front surface of the inner frame 220 may be efficient, such as saving manufacturing time, in comparison with coating only the portion corresponding to the inclined portion 341 of the front portion of the inner frame 220 in the process of coating the inner frame 220 with the reflective layer 340 in the manufacturing process. For the same reason, in addition to the front surface of the inner frame 220, the rear surface of the inner frame 220 facing the rear portion 211 of the outer frame 210, or the rear extension 221 may be coated with a material having high reflectivity.

Furthermore, unlike illustrated in FIG. 6, the reflective layer 340 may be not provided to be coated on one side of the inner frame 220, but may be provided integrally with the inner frame 220. That is, the inner frame 220 may be integrally provided to include a material having high reflectivity. For example, the inner frame 220 may be formed integrally using a metal material and then processed to improve the reflectivity.

Even when the inner frame 220 is integrally formed to include a material having high reflectivity, it can be seen that the reflective layer 340 is a thin layer provided on one surface, facing the color layer 330, of the inner frame 220, and is a component included in the optical assembly 300. The thin layer provided on one surface of the inner frame 220 may be regarded as the reflective layer 340, and the other parts may be regarded as a component included in the door body 200.

For convenience of description in a description with reference to FIGS. 7 to 21, the reflective layer 340, which is one component of the optical assembly 300, is described without distinguishing the reflective layer 340 from the inner frame 220, which is one component of the door body 200, and in the description of the configuration or function of the optical assembly 300, it is assumed that only the reflective layer 340 is arranged at the position of the inner frame 220.

However, the reflective layer 340 refers to a configuration arranged between the inner frame 220 and the plate 310, and thus an expression "direction in which the reflective layer 340 faces" or "direction to which the reflective layer 340 is directed" may represent a direction, in which one surface, which is directed to the rear surface of the plate 310, of the inner frame 220 faces, that is, a direction in which the front surface of the inner frame 220 faces. An expression "one surface of the reflective layer 340" may refer to "one surface of the reflective layer 340 coated on the front surface of the inner frame 220".

A specific configuration and feature of the reflective layer 340 will be described later.

In the above, the configuration forming the door 100 of the clothes treating apparatus 1 according to an embodiment of the disclosure has been described, but the disclosure is not limited thereto and may be configured in various ways.

For example, FIGS. 3 to 6 illustrate that the outer frame 210 includes the rear portion 211 and the side portion 212 bent and extended from the rear portion 211 so as to form the rear surface and the side surface of the door 100. However, it is merely an example for describing the shape of the door according to the disclosure. Alternatively, a component forming the side surface of the door and a component forming the rear surface of the door according to the disclosure may be separate components.

Alternatively, the door 100 may not include the middle plate 400.

Hereinafter the configuration or function of the optical assembly 300 according to an embodiment of the disclosure will be described in more detail.

Figure 8:
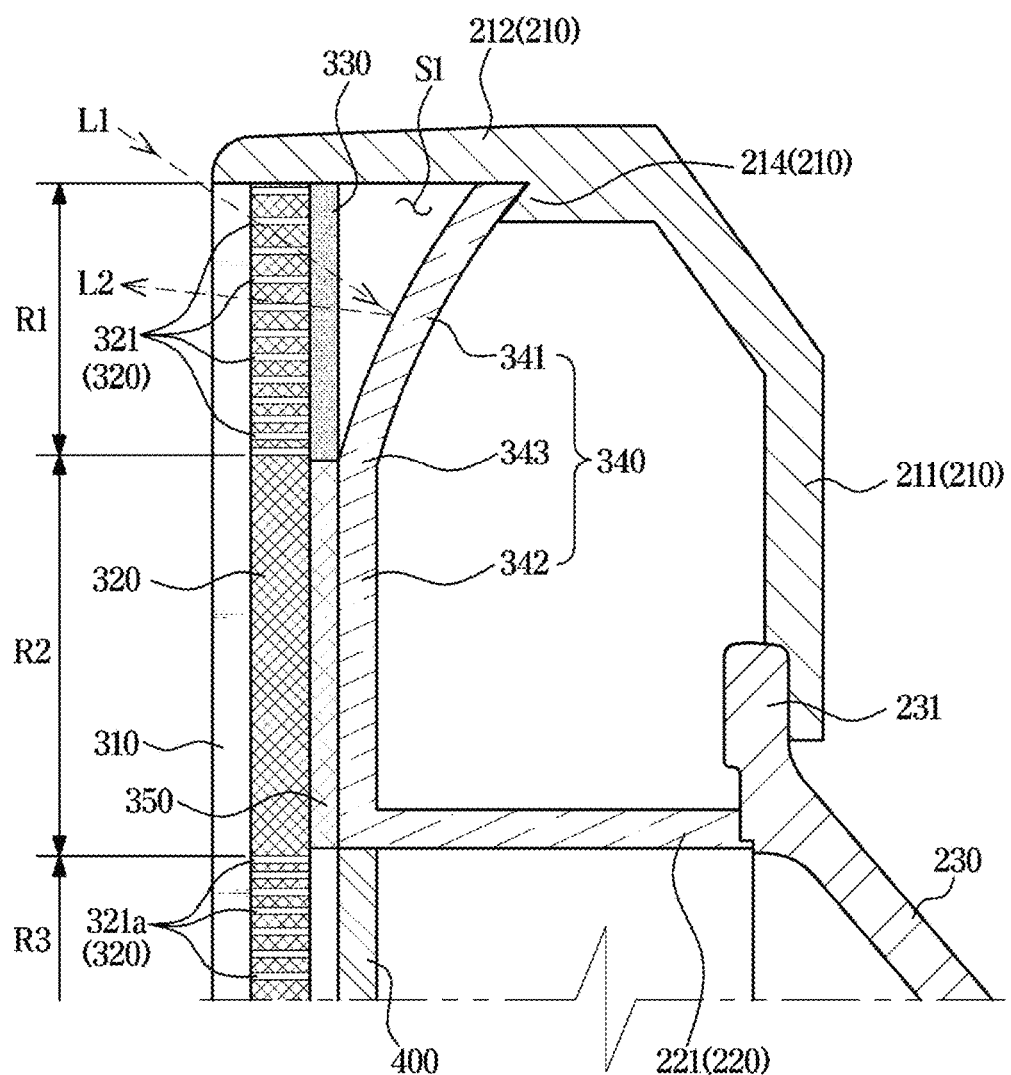
FIG. 8 is an enlarged-view of a part Y of FIG. 7.
Figure 8:
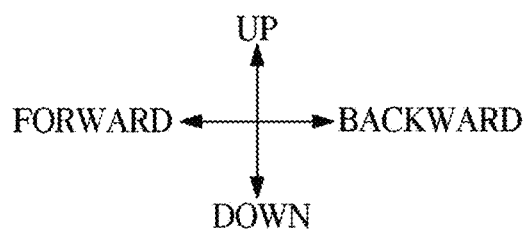

FIG. 7 is a side cross-sectional view of the door of FIG. 3 taken along a line B-B'. FIG. 8 is an enlarged view of a part Y of FIG. 7.

In a description of the door 100 including the optical assembly 300 with reference to FIGS. 7 and 8, a ratio of a length or width of each component forming the optical assembly 300 is briefly shown for convenience of description, and thus the ratio thereof may be different from actual ratios of components forming the optical assembly 300. For example, a ratio between a thickness of the pattern layer 320 or the color layer 330 and a thickness of the plate 310 may be different from that illustrated in FIG. 7, and the thickness of the pattern layer 320 and the color layer 330 may be significantly less than the thickness of the plate 310. Further, the size, arrangement or number of the optical patterns 321 formed on the pattern layer 320 may be provided differently from those illustrated in FIGS. 7 and 8.

Referring to FIGS. 7 and 8, the door 100 may include the optical assembly 300 provided on one side of the door body 200. The optical assembly 300 may be provided on the outer side of the door 100.

The optical assembly 300 may include the plate 310, the pattern layer 320, the color layer 330 and the reflective layer 340. Light incident from the outside of the clothes treating apparatus 1 may sequentially pass through the plate 310, the pattern layer 320, and the color layer 330 (L1), and light passing through the color layer 330 may be reflected by the reflective layer 340 and then sequentially pass through the color layer 330, the pattern layer 320, and the plate 310 (L2).

Particularly, the optical assembly 300 may include the plate 310 arranged to cover one side of the door body 200 and provided to transmit light. In other words, the plate 310 may cover one side of the inner frame 220. The plate 310 may form the outer surface of the door 100. The configuration or feature of the plate 310 are as described above.

The optical assembly 300 may include the pattern layer 320 arranged between the plate 310 and the door body 200. In other words, the pattern layer 320 may be arranged on the inner side of the plate 310. In other words, the pattern layer 320 may be laminated to the rear surface of the plate 310 in one direction (hereinafter referred to as 'first direction').

As described above, the pattern layer 320 may be formed to have a substantially annular shape along the outer rim of the door 100. In other words, the pattern layer 320 may be arranged along the outer rim of the optical assembly 300.

FIGS. 7 and 8 illustrate that the pattern layer 320 extends to one end of the outer rim of the plate 310, but the range in which the pattern layer 320 extends is not limited thereto. Even when the pattern layer 320 is arranged along the outer rim of the optical assembly 300, the pattern layer 320 may not cover up to the end of the plate 310.

The pattern layer 320 may include the optical pattern 321 provided to transmit at least a portion of the light transmitted through the plate 310. At least a portion of the light transmitted through the plate 310 may pass through the pattern layer 320 through the optical pattern 321, and conversely, at least a portion of the light transmitted through the plate 310 may be blocked by a portion except for the optical pattern formed on the pattern layer 320. For example, the pattern layer 320 may include a portion having a back color to absorb a portion of light transmitted through the plate 310, thereby blocking the propagation of light. However, it is merely an example of a configuration in which the pattern layer 320 blocks light, and the color of the pattern layer 320 is not limited thereto.

Similarly, when the light reflected by the reflective layer 340 travels toward the plate 310, at least a portion of the light transmitted through the color layer 330 may pass through the pattern layer 320 through the optical pattern 321 and exit to the outside of the door 100 through the plate 310. Conversely, at least another portion of the light transmitted through the color layer 330 may be blocked from traveling by a portion other than the optical pattern 321 formed on the pattern layer 320.

With the above-mentioned configuration, the light L1 incident on one side of the plate 310 from the outside of the door 100 or the light L2 reflected toward the plate 310 by the reflective layer 340 and exiting to the outside of the door 100 may be selectively transmitted or blocked by the pattern layer 320. In other words, the light transmitted through the optical pattern 321 may eventually appear on the outer side of the door 100, and a pattern, in which light exits along the optical pattern 321, may appear on the outer side of the door 100.

The optical pattern 321 may have a shape that penetrates from at least one side of the pattern layer 320 toward the opposite side to allow light to transmit the pattern layer 320. FIGS. 7 and 8 illustrate that the direction in which the optical pattern 321 penetrates the pattern layer 320 is parallel to the lamination direction of the pattern layer 320, but is not limited thereto. The optical pattern 321 may be formed to penetrate the pattern layer 320 in various directions. For example, the optical pattern 321 may be formed to penetrate the pattern layer 320 in an inclined direction with respect to the lamination direction of the pattern layer 320. Alternatively, the plurality of optical patterns 321 may penetrate the pattern layer 320 in different directions.

The optical pattern 321 may include a plurality of hole shapes formed on the pattern layer 320. The plurality of holes of the optical pattern 321 may have various sizes or shapes according to a desired optical effect, and may be located in various positions on the pattern layer 320.

The pattern layer 320 may be formed by being applied to the rear surface of the plate 310. In other words, the pattern layer 320 may be a thin layer applied to the rear surface of the plate 310.

For example, the pattern layer 320 may be manufactured by printing ink on the rear surface of the plate 310. Particularly, the pattern layer 320 may be manufactured by various printing methods such as screen printing (or silk screen printing) or digital printing.

Screen printing refers to a method of printing a desired color on an object-to-be-printed in such a way that a screen formed of a material such as silk is arranged on the object-to-be-printed, and pre-colored ink is applied on the screen by a squeegee, and then dried. Digital printing refers to a method of printing a desired color on an object-to-be-printed in such a way that color information according to the CMYK color system or RGB color system is input to a digital printing device such as an inkjet printer or a laser printer and the digital printing device sprays cyan, magenta, yellow and black color ink or toner.

When the pattern layer 320 is manufactured by the screen printing, mass production may be easy and the time of the printing process may be reduced. When the pattern layer 320 is manufactured by the digital printing, more precise printing may be possible, and because printing information is easily changed, it is easy to form the optical patterns 321 in various shapes.

Alternatively, the pattern layer 320 may be manufactured by a pad printing method in which ink is applied to a printing plate, on which an image such as a pattern-to-be-printed is formed in intaglio, and then the ink is transferred to an object-to-be-printed using a silicon pad.

The above-described method of printing the pattern layer 320 is merely one of examples of printing the pattern layer according to the disclosure, and various methods of printing the pattern layer 320 may be provided.

The optical pattern 321 may be formed while the pattern layer 320 is printed on the rear surface of the plate 310. Alternatively, the optical pattern 321 may be formed by removing a portion of the optical pattern 321 after the pattern layer 320 is printed.

For example, the optical pattern 321 may be manufactured in such a way that ink is not applied to a position, in which the optical pattern 321 is located, when the pattern layer 320 is printed. Alternatively, the optical pattern 321 may be manufactured in such a way that after the pattern layer 320 is printed, a portion, in which the optical pattern 321 is to be located, is de-filmed by a laser.

A method of forming the optical pattern 321 in the process of printing the pattern layer 320 is not limited thereto, and thus the optical pattern 321 may be manufactured in various ways.

Alternatively, the pattern layer 320 and the optical pattern 321 provided on the pattern layer 320 may be formed in various ways. For example, the pattern layer 320 may be manufactured in a separate configuration to provide the optical pattern 321, and then the pattern layer 320 may be attached to the rear surface of the plate 310.

The optical pattern 321 may be arranged in a predetermined region of the pattern layer 320. Particularly, the pattern layer 320 may include a pattern region R1 in which the optical pattern 321 is formed and a blocking region R2 in which the optical pattern 321 is not formed. The pattern region R1 may be a region in which the optical pattern 321 is formed to transmit at least a portion of light transmitted through the plate 310. The blocking region R2 may be provided to block at least another portion of light transmitted through the plate 310.

The blocking region R2 may be arranged on an inside of the radial direction of the door 100 from the pattern region R1. In other words, the pattern region R1 may be arranged in an outer direction of the blocking region R2. In other words, the pattern region R1 may be arranged along an outer rim of the pattern layer 320.

The pattern region R1 and the blocking region R2 may be provided to have a substantially annular shape arranged along the outer rim of the door 100. In other words, the pattern region R1 and the blocking region R2 may have an annular shape arranged along the outer rim of the optical assembly 300.

Because the optical pattern 321 is formed in the pattern region R1, the light L1 incident from the outside of the door 100 may sequentially pass through the plate 310, the pattern region R1, and the color layer 330 and then reach the reflective layer 340 (particularly, the inclined portion 341). The light L2 reflected by the reflective layer 340 may sequentially pass through the color layer 330, the pattern region R1, and the plate 310 and then exit to the outside of the door 100.

Accordingly, the optical effect appearing on the outer side of the door 100, that is, a pattern formed by light may appear at a position corresponding to the pattern region R1.

Conversely, because the blocking region R2 covers the rear surface of the plate 310 and blocks the propagation of light, such as absorbing light passing through the plate 310, the optical effect appearing on the outer side of the door 100 may not appear at the position corresponding to the blocking region R2.

As illustrated in FIG. 8, the plate 310 and the reflective layer 340 may be coupled to each other by the adhesive 350 provided between the plate 310 and the reflective layer 340 (particularly, the extension portion or the fixer 342). The quality of the appearance of the door 100 may be deteriorated by the adhesive 350. However, it is possible to prevent the adhesive 350 from being visible from the outside of the door 100 through the plate 310 because the blocking region R2 covers the adhesive 350.

Further, the blocking region R2 may be arranged to define a range of an optical effect displayed through the pattern region R1. For example, the blocking region R2 may extend to an outer direction beyond a boundary between the pattern region R1 and the blocking region R2 illustrated in FIG. 8. The blocking region R2 may cover the color layer 330 and a part of the front portion of the inclined portion 341 of the reflective layer 340. Alternatively, another blocking region (not shown) may be provided in the middle of the pattern region R1 illustrated in FIG. 8, but the blocking region may be a portion, in which the optical pattern 321 is not arranged and light is blocked, in the pattern region R1.

FIGS. 7 and 8 illustrate that an area of the optical pattern 321 arranged on the pattern region R1 is not less than a portion, which is other than the optical pattern 321 in the pattern region R1, that is a portion provided to block light. However, it is not limited thereto. For example, the area of the portion occupied by the optical pattern 321 may be increased to increase light transmittance on the pattern region R1, or the area occupied by the optical pattern 321 may be decreased to decrease the light transmittance.

The optical pattern 321 may be provided to form a single large hole in the pattern region R1. That is, it is not required that the optical pattern 321 is formed in the form of a plurality of small holes as illustrated in FIGS. 7 and 8, but the optical pattern 321 may be provided to transmit most of the light L1 incident on the reflective layer 340 and the light L2 reflected by the reflective layer 340. As described above, the optical pattern 321 may vary according to optical effects to be provided to a user.

Further, the pattern layer 320 may further include a sub-pattern region R3 provided on the inside of the radial direction of the door 100 than the blocking region R2. A sub-optical pattern 321a formed to transmit light may be provided in the sub-pattern region R3. The color layer 330 or the reflective layer 340 may not arranged behind the sub-pattern region R3, which is different from the rear of the pattern region R1. Accordingly, it may be difficult to provide an optical effect equivalent to that of the pattern region R1, but when the amount of light outside the clothes treating apparatus 1 is high, it is possible to provide a predetermined aesthetic feeling and it is possible to provide an aesthetic feeling that is naturally changed from the blocking region R2 toward the inside of the radial direction of the door 100.

The optical assembly 300 may include the color layer 330 arranged between the pattern layer 320 and the door body 200. In other words, the color layer 330 may be arranged on the inner side of the pattern layer 320. In other words, the color layer 330 may be laminated on the rear surface of the pattern layer 320 with respect to the direction in which the pattern layer 320 is laminated on the rear surface of the plate 310, that is, in the first direction.

The color layer 330 may be provided to transmit at least a portion of the light transmitted through the optical pattern 321. Conversely, the color layer 330 may be provided to transmit at least a portion of the light that is reflected toward the plate 310 by the reflective layer 340.

The color layer 330 may be provided to have at least one color. The inherent color of the color layer 330 may be a single color or composed of two or more colors. Alternatively, the color layer 330 may be provided in such a way that a color thereof changes over time.

Particularly, in light transmitted through the plate 310 and the pattern layer 320 or light reflected by the reflective layer 340, a wavelength of light incident on the color layer 330 may be converted while passing through the color layer 330. The conversion of the wavelength of light may vary according to the color of the color layer 330.

In the process in which the light incident on the color layer 330 passes through the color layer 330, at least a portion of the light may be absorbed, scattered, refracted, or reflected by the color layer 330 while the wavelength of the light is converted. Particularly, light distributed in a specific wavelength range may be more absorbed, scattered, refracted, or reflected by the color layer 330 than light distributed in other wavelength ranges. Accordingly, the light transmitted through the color layer 330 and emitted may include more the light distributed in a different wavelength range, and the wavelength of light may be converted as a whole.

Accordingly, the color layer 330 may impart a color to the light incident on the color layer 330, and the color imparted to the light may correspond to the inherent color of the color layer 330. When the light incident on the color layer 330 is white light, the light transmitted through the color layer 330 may have the same color as or at least a similar color to that of the color layer 330. Further, when the light incident on the color layer 330 is light having a color other than white, a color of the light transmitted through the color layer 330 may be converted in accordance with the inherent color of the color layer 330.

The color layer 330 may be arranged to cover the optical pattern 321. In other words, the color layer 330 may be arranged to cover the pattern region R1. The color layer 330 may be arranged on the rear surface of the pattern region R1 and may be laminated on the rear surface of the pattern region R1 in the first direction (direction in which the pattern layer 320 is laminated on the plate 310).

Particularly, the color layer 330 may be provided to cover at least a portion of the pattern region R1. In other words, the color layer 330 may be enough to cover at least a portion of the pattern region R1 and may not cover the entire region of the pattern region R1. Alternatively, the color layer 330 may cover at least a portion of the blocking region R2 in addition to the pattern region R1. The arrangement of the color layer 330 in the pattern region R1 may vary according to an optical effect to be provided.

However, it is not limited thereto, and the color layer 330 may be arranged in various ways as long as the color layer 330 is arranged to transmit at least a portion of the light transmitted through the optical pattern 321. Even when at least a portion of the optical pattern 321 is not covered by the color layer 330, light transmitted through the optical pattern 321 that is not covered by the color layer 330 may be incident on the color layer 330 or light reflected by the reflective layer 340 may be incident on the color layer 330 according to the direction in which the optical pattern 321 penetrates the pattern layer 320.

The color layer 330 may be provided in a substantially annular shape arranged along the outer rim of the door 100 to correspond to the pattern layer 320. In other words, the color layer 330 may be provided in an annular shape along the outer rim of the optical assembly 300. Accordingly, an optical effect by the optical assembly 300 may appear in a substantially annular shape on the outer side of the door 100.

However, it is not limited thereto, and the shape of the color layer 330 may vary according to the type of optical effect to be provided.

FIGS. 7 and 8 illustrate that the color layer 330 extends to one end of the outer rim of the plate 310, but the range in which the color layer 330 extends is not limited thereto. Even when the color layer 330 is arranged along the outer rim of the optical assembly 300, the color layer 330 may not extend to the end of the outer rim of the plate 310.

Alternatively, the color layer 330 may extend beyond the outer rim of the pattern layer 320. For example, even when the pattern layer 320 does not extend to the end of the outer rim of the plate 310, the color layer 330 may extend to the end of the outer rim of the plate 310.

The color layer 330 may be formed by being applied to the rear surface of the pattern layer 320. In other words, the color layer 330 may be a thin layer applied to the rear surface of the pattern layer 320.

For example, the color layer 330 may be manufactured by printing ink on the rear surface of the pattern layer 320. Particularly, the color layer 330 may be manufactured by various printing methods such as screen printing (or silk screen printing), pad printing or digital printing. Alternatively, the color layer 330 may be manufactured by spraying ink onto the rear surface of the pattern layer 320 using a spray.

However, the above examples of the method of printing the color layer 330 are merely examples of printing the color layer according to the disclosure, and various methods of printing the color layer 330 may be provided.

When the pattern layer 320 is applied to the rear surface of the plate 310 in the printing method using ink, the color layer 330 may applied to the rear surface of the pattern layer 320 after the pattern layer 320 is dried, so as to prevent the ink of the color layer 330 from being mixed with the ink of the pattern layer 320.

Alternatively, the color layer 330 may be formed in various ways. For example, the color layer 330 may be manufactured in a separate component and then attached to the rear surface of the pattern layer 320.

The optical assembly 300 may include the reflective layer 340 arranged between the color layer 330 and the door body 200. In other words, the reflective layer 340 may be arranged on the inner side of the color layer 330. In other words, the reflective layer 340 may be formed from the color layer 330 in the first direction (the direction in which the pattern layer 320 is laminated to the rear surface of the plate 310 and the direction in which the color layer 330 is laminated to the rear surface of the pattern layer 320).

The reflective layer 340 may be provided on one side, facing the color layer 330, of the door body 200. Particularly, the reflective layer 340 may be provided on one side, facing the color layer 330, of the inner frame 220.

The reflective layer 340 may be provided to reflect light, which is transmitted through the color layer 330, toward the plate 310. As mentioned above, the reflective layer 340 may be provided to include a material having high reflectivity.

Meanwhile, generally, the clothes treating apparatus 1 may be placed indoors, such as a home, and the external light source of the clothes treating apparatus 1 may be mainly located in the upper side thereof.

In addition, generally, when a user looks at the door 100 of the clothes treating apparatus 1, the user can look at the door 100 from the front and upper side.

Therefore, in a state in which the reflective layer 340 extends in a direction parallel to the plate 310 as a whole, that is, a state in which the reflective layer 340 is provided in a flat plate shape, it may be difficult for the reflected light L2 to sufficiently travel toward the user's line of sight even when the light L1 incident through the plate 310 is reflected by the reflective layer 340.

In addition, when the reflective layer 340 extends in a direction parallel to the plate 310 as a whole, it may be difficult for the reflective layer 340 to generate an optical effect capable of providing a three-dimensional effect to a user.

Accordingly, the reflective layer 340 may include the inclined portion 341 extending in a direction different from the extension direction of the plate 310. In other words, the inclined portion 341 may be inclined with respect to the radial direction of the door 100. In other words, the inclined portion 341 may be inclined with respect to the radial direction of the plate 310. In other words, one side of the inclined portion 341 may extend in a direction away from the rear surface of the plate 310. FIG. 8 illustrates that one side of the inclined portion 341 arranged in a direction away from the rear surface of the plate 310 is a reflective layer support 214 to be described later, but is not limited thereto (refer to FIGS. 14, 17, 18, etc.).

The inclined portion 341 may be arranged between the color layer 330 and the door body 200. In other words, the inclined portion 341 may be arranged on the inner side of the color layer 330, and arranged from the color layer 330 in the first direction (the direction in which the pattern layer 320 is laminated to the plate 310 or the direction in which the color layer 330 is laminated to the pattern layer 320).

The inclined portion 341 may be arranged behind the pattern region R1. In other words, the pattern region R1 may cover the front of the inclined portion 341. In addition, the color layer 330 may be arranged between the pattern region R1 and the inclined portion 341 to cover the front of the inclined portion 341.

As the pattern layer 320 and the color layer 330 extend in a direction parallel to the plate 310, the inclined portion 341 may be inclined with respect to the extension direction of the pattern layer 320 or the extension direction of the color layer 330.

Particularly, the inclined portion 341 may be inclined with respect to the extension direction of the pattern layer 320 to allow a distance between the inclined portion 341 and the pattern layer 320 to be different as the inclined portion 341 is toward the direction of the outer edge of the pattern layer 320. Further, the inclined portion 341 may be inclined with respect to the extension direction of the color layer 330 to allow a distance between the inclined portion 341 and the color layer 330 to be different as the inclined portion 341 is toward the direction of the outer edge of the color layer 330.

Figure 11:
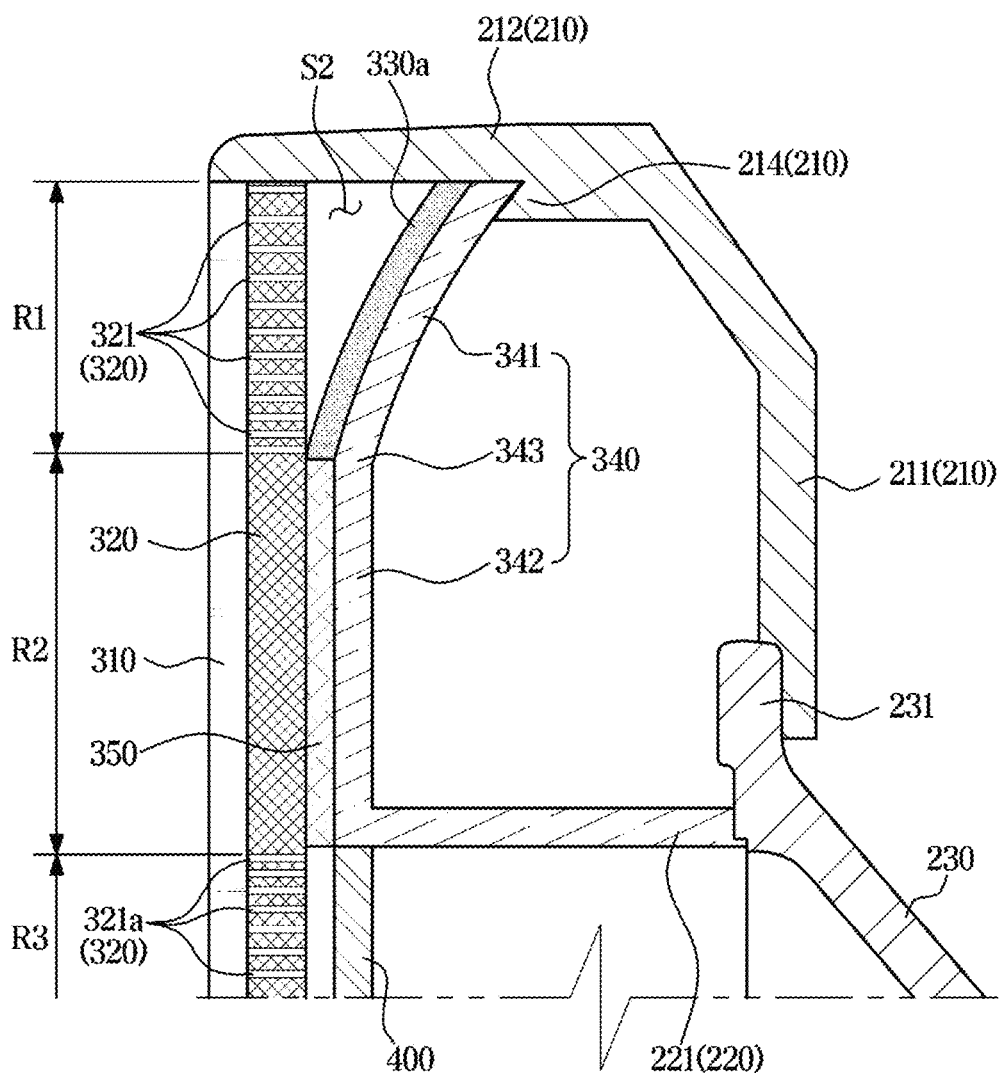
FIG. 11 is a view illustrating an optical assembly of a clothes treating apparatus according to another embodiment of the disclosure, particularly, an optical assembly in an embodiment in which an arrangement of a color layer is modified.
Figure 11:
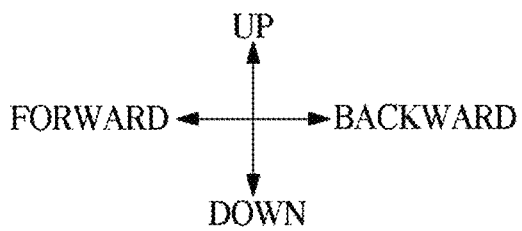
Figure 12:
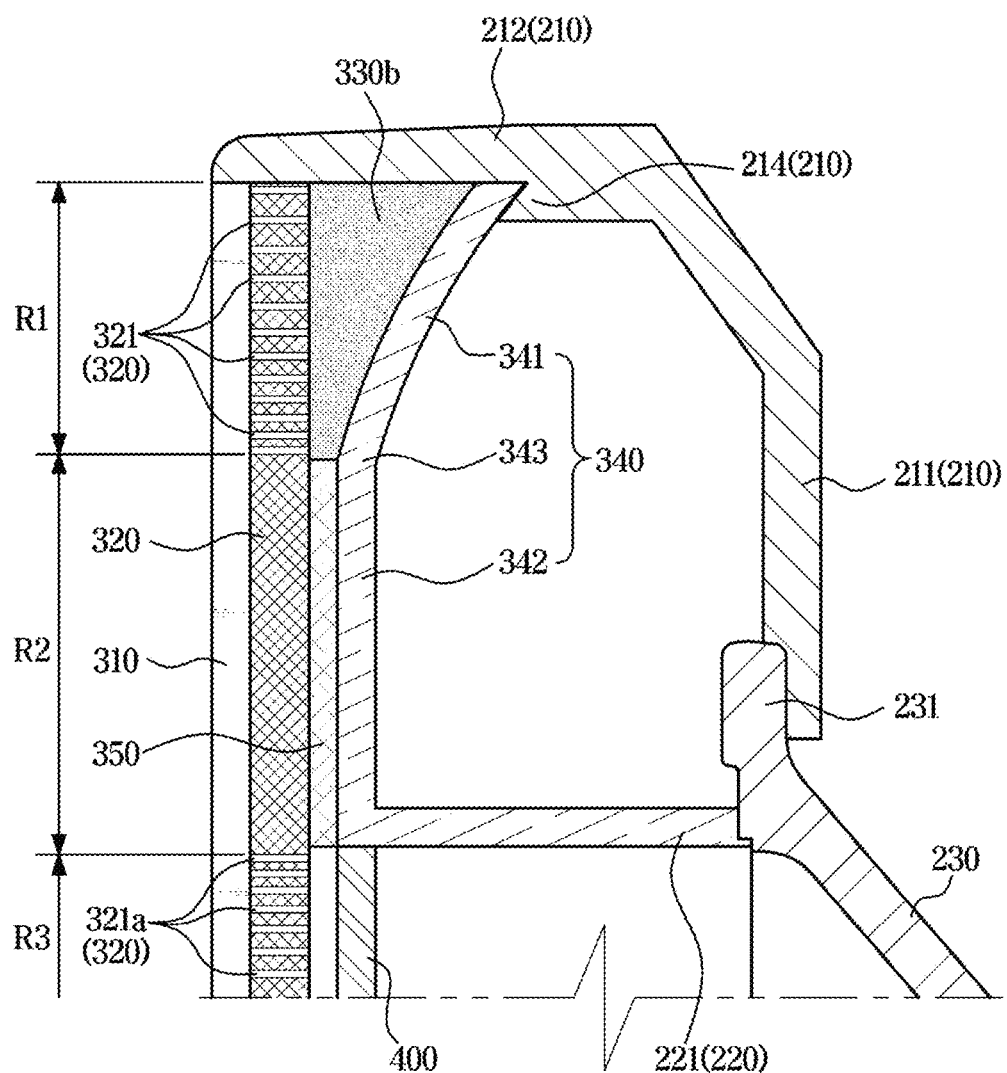
FIG. 12 is a view illustrating an optical assembly of a clothes treating apparatus according to another embodiment of the disclosure, particularly, an optical assembly in an embodiment in which a shape of a color layer is modified.

However, it is not limited thereto, and for example, the relationship between the inclined portion 341 and the color layer 330 may vary according to the shape of the color layer 330, as illustrated in FIGS. 11 and 12.

Accordingly, the light L1 incident on the plate 310 may sequentially pass through the plate 310, the pattern layer 320, and the color layer 330 and reach the inclined portion 341. In addition, the light L2 reflected by the inclined portion 341 may sequentially pass through the color layer 330, the pattern layer 320, and the plate 310 and exit to the outside of the door 100.

As illustrated in FIGS. 7 and 8, the inclined portion 341 may be inclined to allow at least a portion of one surface facing the color layer 330 to face upward of the door 100. In other words, the inclined portion 341 may be inclined to allow at least a portion of the front surface of the inclined portion 341 to face upward of the door 100.

As at least a portion of the inclined portion 341 has a structure provided to face upward of the door 100, a function of reflecting the light L1 incident from the outside of the clothes treating apparatus 1 to the direction of the user's line of sight may be further improved in comparison with a case in which the reflective layer 340 does not include the inclined portion 341 or a case of including a structure that is inclined in the different direction.

The reflective layer 340 may be provided in a substantially annular shape arranged along the outer rim of the door 100 to correspond to the pattern layer 320 and the color layer 330. In other words, the reflective layer 340 may be provided in a substantially annular shape along the outer rim of the optical assembly 300. Accordingly, the inclined portion 341 may also be provided in a substantially annular shape arranged along the outer rim of the door 100. In other words, the inclined portion 341 may be formed in a substantially annular shape arranged along the outer rim of the optical assembly 300.

Accordingly, an optical effect by the optical assembly 300 may appear in a substantially annular shape on the outer side of the door 100. However, it is not limited thereto, and the shape of the reflective layer 340 may vary according to the type of optical effect to be provided.

The reflective layer 340 or the inclined portion 341 are formed to have an annular shape. Accordingly, for convenience in design and manufacture, the inclined portion 341 may be inclined to allow at least a portion of one surface facing the color layer 330 to face upward of the door 100, but to allow at least another portion of the one surface facing the color layer 330 to face downward of the door 100, as illustrated in FIG. 7.

Particularly, at least a portion of the inclined portion 341 arranged in the upper portion of the optical assembly 300 may be inclined to allow at least a portion of a surface facing the color layer 330 to face upward of the door 100. At the same time, at least a portion of the inclined portion 341 arranged in the lower portion of the optical assembly 300 may be inclined to allow at least a portion of a surface facing the color layer 330 to face downward of the door 100. The term 'upper portion of the optical assembly 300' in which at least a portion of the inclined portion 341 is arranged may refer to the upper portion of the door 100, and the term 'lower portion of the optical assembly 300' in which at least a portion of the inclined portion 341 is arranged may refer to the lower portion of the door 100.

In other words, at least a portion of the inclined portion 341 may be inclined to allow at least a portion of one surface facing the color layer 330 to face the outer direction of the optical assembly 300. The term 'outer direction of the optical assembly 300' may refer to the outer direction of the door 100, that is, the direction of the outer edge of the door 100. The definition may apply to the description below.

In other words, as the inclined portion 341 is toward the outer rim of the optical assembly 300, the inclined portion 341 may be inclined to be farther from the rear surface of the plate 310 and extend toward the rear side of the door 100.

In this case, the optical effect by the optical assembly 300 may be effective in the upper portion of the optical assembly 300, but the optical effect by the optical assembly 300 may be less effective in the lower portion than the upper portion of the optical assembly 300.

As illustrated in FIGS. 7 and 8, the inclined portion 341 may include a curved inclined surface. The optical assembly 300 may provide an optical effect in the form of a softer connection.

However, the arrangement or shape of the inclined portion 341 is not limited to the above example, and may vary according to the characteristics of the optical effect to be provided.

The reflective layer 340 may further include the extension portion 342 extending from one end of the inclined portion 341.

The extension 342 may extend from one end of an inner edge (hereinafter referred to as 'inner rim' for convenience of description) of the inclined portion 341. In other words, the inclined portion 341 may be arranged along the outer rim of the extension portion 342.

The extension portion 342 may be bent and extended from one end of the inclined portion 341, and may be formed in parallel to the rear surface of the plate 310. The extension portion 342 may fix the reflective layer 340 to the plate 310. For example, the adhesive 350 may be applied between the extension portion 342 and the pattern layer 320 to fix the reflective layer 340 to the plate 310.

Accordingly, the extension portion 342 may also be referred to as the fixer 342.

A portion in which the inclined portion 341 and the extension portion 342 are connected may be referred to as a bending member 343. In other words, the extension portion 342 may be bent and extended from the bending member 343 that is one end of the inclined portion 341.

The above-described blocking region R2 of the pattern layer 320 may be provided to cover at least the extension portion 342. Unlike the inclined portion 341, the extension portion 342 may not directly generate an optical effect, and when the adhesive 350 is applied, the quality of the appearance may be deteriorated and thus the extension portion 342 may be covered by the blocking region R2 through which light is not transmitted.

In other words, the inclined portion 341 may be arranged to correspond to the pattern region R1, and the extension portion 342 may be arranged to correspond to the blocking region R2.

Particularly, the boundary between the pattern region R1 and the blocking region R2 may be arranged on the outer side of the radial direction of the door 100 than the boundary between the inclined portion 341 and the extension portion 342. That is, the boundary between the pattern region R1 and the blocking region R2 may be arranged on the outer side of the radial direction of the door 100 than the bending member 343.

In other words, the inner edge of the pattern region R1 may be located closer than the inner edge of the inclined portion 341 to the outer edge of the optical assembly 300. In addition, the inner edge of the pattern region R1 may be located in the direction of the outer edge of the optical assembly 300 than the outer edge of the extension portion 342. That is, one end of the inner rim of the pattern region R1 may be located in the outer direction of the optical assembly 300 than the bending member 343.

However, it is not limited thereto, and the boundary between the pattern region R1 and the blocking region R2 may be arranged in parallel to the boundary between the inclined portion 341 and the extension portion 342. Alternatively, the boundary between the pattern region R1 and the blocking region R2 may be arranged on the inner side of the radial direction of the door 100 than the boundary between the inclined portion 341 and the extension portion 342. This may be changed according to the characteristics of the structure of the optical assembly 300 or the characteristics of optical effects to be provided.

The door body 200 may include the reflective layer support 214 provided to support one side of the reflective layer 340. Particularly, the reflective layer support 214 may be provided on the inner side of the outer frame 210 to support the outer rim of the reflective layer 340. FIGS. 7 and 8 illustrate that the reflective layer support 214 is provided on the inner side of the side portion 212, but is not limited thereto. In another aspect, the reflective layer support 214 may be a component provided to support the outer rim of the inner frame 220.

The shape of the reflective layer support 214 may vary according to the shape of the inclined portion 341, such as the direction of inclination. Alternatively, according to the shape of the inner frame 220, the reflective layer support 214 may be formed regardless of the inclination direction of the inclined portion 341.

However, the reflective layer 340 may be supported by various components of the door 100, such as the plate 310 and the rear cover 230, in addition to the outer frame 210 including the reflective layer support 214.

As the color layer 330 is arranged in parallel to the pattern layer 320 at the rear of the pattern layer 320, a separation space S1 may be formed between the inclined portion 341 and the color layer 330. In other words, the inclined portion 341 may form the separation space S1 between the inclined portion 341 and the color layer 330 and may extend in a direction different from that of the plate 310.

The separation space S1 may be formed as an air gap in which air is arranged. However, it is not limited thereto, and the separation space S1 may be filled with a material through which light passes. For example, the separation space S1 may be filled with an optical adhesive material that is provided to transmit light by including a material such as acrylic, silicone, and urethane.

Alternatively, the separation space S1 may not be formed between the color layer 330 and the inclined portion 341 (refer to FIGS. 11 and 12).

With the above-mentioned configuration, the optical assembly 300 may generate an optical effect, provide a three-dimensional effect or aesthetic feeling to a user, and improve the quality of the appearance of the product. Particularly, because the optical assembly 300 includes the inclined portion 341, an optical effect appearing to the outside of the door 100 may vary according to the direction in which the user views the door 100, and thus it is possible to provide an improved three-dimensional effect to the user.

In addition, because the optical assembly 300 generates an optical effect using light introduced from the outside of the clothes treating apparatus 1, a light source may not be built into the clothes treating apparatus 1, thereby reducing manufacturing costs. Further, because no power is required to generate an optical effect, costs due to power consumption may be reduced.

Further, the optical assembly 300 reflects light by the reflective layer 340 including the inclined portion 341, so as to generate an optical effect. Accordingly, the plate 310 may be manufactured in a flat plate shape without a curvature and thus it is possible to reduce manufacturing cost and time.

Meanwhile, the embodiment described with reference to FIGS. 7 and 8 is merely an example of the clothes treating apparatus and the optical assembly included in the clothes treating apparatus according to the disclosure, and the disclosure is not limited thereto.

For example, unlike the above description, the reflective layer 340 may be provided separately from the inner frame 220. Alternatively, the reflective layer 340 may include only the inclined portion 341 extending in a direction different from the extension direction of the plate 310 and may not include the extension portion 342.

Hereinafter an embodiment according to the disclosure that is different from the embodiment illustrated in FIGS. 7 and 8 will be described.

Figure 9:
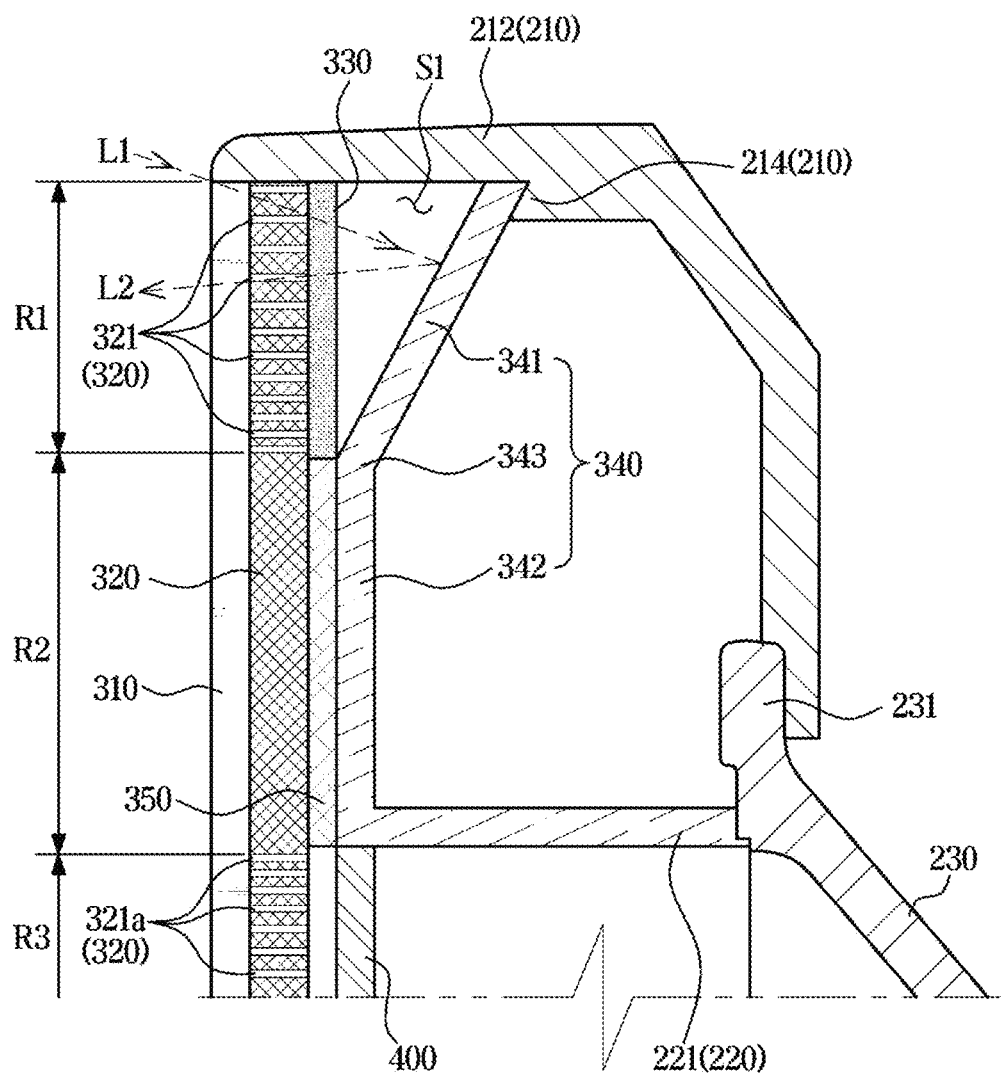
FIG. 9 is a view illustrating an optical assembly of a clothes treating apparatus according to another embodiment of the disclosure, particularly, an optical assembly in an embodiment in which a shape of a reflective layer is modified.
Figure 9:
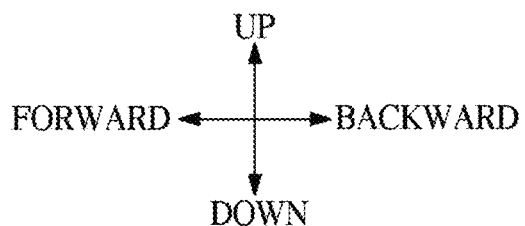

FIG. 9 is a view illustrating an optical assembly of a clothes treating apparatus according to another embodiment of the disclosure, particularly, an optical assembly in an embodiment in which a shape of a reflective layer is modified.

An optical assembly of a clothes treating apparatus according to another embodiment of the disclosure will be described with reference to FIG. 9. In describing the embodiment illustrated in FIG. 9, because there is a difference in the shape of the inclined portion 341 in comparison with the configuration illustrated in FIGS. 1 to 8, the same reference numerals are assigned to the same configuration including the inclined portion and a description thereof is omitted.

Referring to FIG. 9, the inclined portion 341 of the clothes treating apparatus 1 may include an inclined surface having a constant inclination angle, unlike the inclined portion 341 illustrated in FIGS. 7 and 8.

In other words, the inclined portion 341 illustrated in FIG. 9 may include an inclined surface that extends in a direction different from that of the plate 310 and extends in a constant direction. In other words, the inclined portion 341 may include a substantially flat inclined surface.

When the inclined portion 341 includes an inclined surface having a constant inclination angle, it is possible to provide optical effects different from the state in which the inclined surface includes a curved inclined surface.

Particularly, when the inclined surface of the inclined portion 341 has a constant inclination angle, it is possible to provide an aesthetic feeling that is a less soft feeling in comparison with the inclined surface having a curved shape. Particularly, according to the direction in which a user looks at the door 100, the optical effect appearing on the outside of the door 100 may vary. In this case, when the inclined surface of the inclined portion 341 has a constant angle, it is possible to provide a three-dimensional effect that is relatively less soft. When the inclined surface of the inclined portion 341 is provided in a curved shape, it is possible to provide a three-dimensional effect that is relatively softer.

Further, the inclined portion 341 may be provided to allow an optical effect to radially appear on the outer side of the door 100.

For example, by performing a processing to form irregularities, such as hairline processing, on one surface, facing the color layer 330, of the inclined portion 341 of FIG. 9, it is possible to generate an optical effect appearing in a radial form. When the inclined portion 341 has a constant inclined surface, the radial optical effect may appear more clearly.

However, it is not limited thereto, and as illustrated in FIGS. 7 and 8, even when the inclined portion 341 has a curved inclined surface, it is possible to generate an optical effect appearing in a radial form on the outer side of the door 100 by performing the hairline processing on one surface, facing the color layer 330, of the inclined portion 341.

Figure 10:
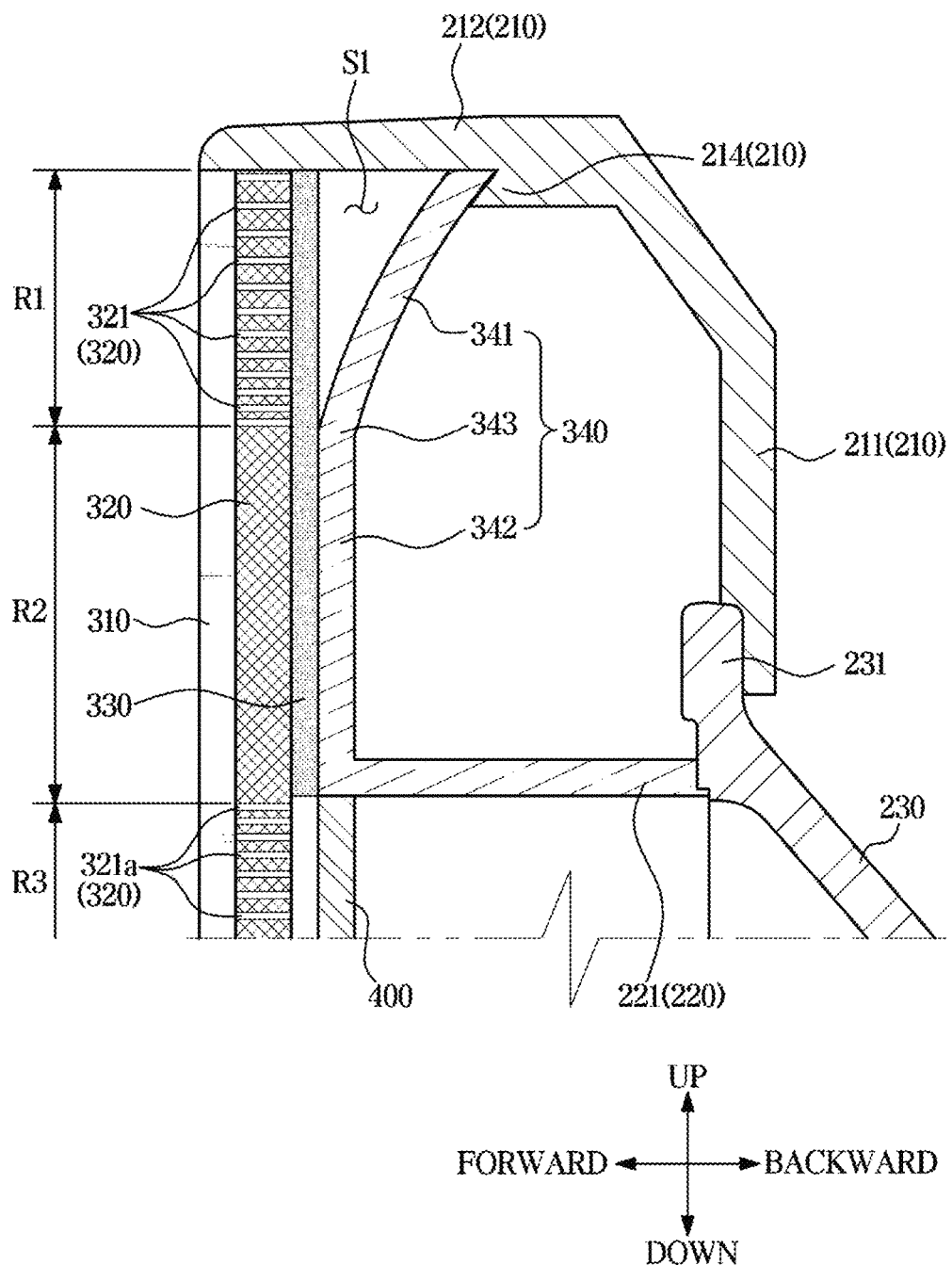
FIG. 10 is a view illustrating an optical assembly of a clothes treating apparatus according to another embodiment of the disclosure, particularly, an optical assembly in an embodiment in which an area, in which a color layer is extended, is modified.

FIG. 10 is a view illustrating an optical assembly of a clothes treating apparatus according to another embodiment of the disclosure, particularly, an optical assembly in an embodiment in which an area, in which a color layer is extended, is modified.

An optical assembly of a clothes treating apparatus according to another embodiment of the disclosure will be described with reference to FIG. 10. In describing the embodiment illustrated in FIG. 10, the same reference numerals are assigned to the same components as those illustrated in FIGS. 1 to 9, and a description thereof is omitted.

Referring to FIG. 10, the color layer 330 may cover the blocking region R2 as well as the pattern region R1 of the pattern layer 320. Particularly, the color layer 330 may be arranged on the rear surface of the pattern region R1 and the blocking region R2 and may cover the front of the extension portion 342. That is, the color layer 330 may be laminated to the rear surface of the pattern region R1 and the blocking region R2 with respect to the first direction.

The color layer 330 may partially cover the blocking region R2 according to the embodiment illustrated in FIGS. 1 to 9, but according to an embodiment illustrated in FIG. 10, the color layer 330 may extend to an end of the inner rim of the blocking region R2 or a position adjacent to an end of the inner rim of the extension portion 342.

As described above, the color layer 330 may be provided as a thin layer applied to the rear surface of the pattern layer 320, and particularly, the color layer 330 may be applied to the rear surface of the pattern region R1 and the blocking region R2.

The color layer 330 may be applied to the rear surface of the pattern region R1 and the blocking region R2 by various printing methods such as silk screen printing, pad printing, digital printing, and spray injection. In addition, when the pattern layer 320 is printed in such a way that the pattern layer 320 is applied to the rear surface of the plate 310, the color layer 330 may be printed on the rear surface of the plate 310 after at least the ink of the pattern region R1 and the blocking region R2 is dried.

However, it is not limited thereto, and the color layer 330 may be formed in various ways to cover the rear surface of the pattern region R1 and the blocking region R2.

Referring to FIGS. 8 and 9, the adhesive 350 may be applied between the extension portion (or fixer) 342 and the blocking region R2 to allow the plate 310 and the reflective layer 340 to be attached to each other.

In the case of FIG. 10, as the color layer 330 extends to the blocking region R2, it may be difficult for the extension portion 342 to be directly attached to the blocking region R2 by the adhesive 350.

Therefore, the reflective layer 340 may not be directly fixed to the plate 310. The reflective layer 340 may be fixed to the outer frame 210 through a different component such as the reflective layer support 214 or fixed to the rear cover 230 through a different component such as the rear extension 221. Alternatively, an adhesive (not shown) may be applied between a portion of the color layer 330 applied to the rear surface of the blocking region R2 and the extension portion 342 so as to allow the extension portion 342 to be attached to the color layer 330. Therefore, the plate 310 and the reflective layer 340 may be fixed to each other.

FIG. 11 is a view illustrating an optical assembly of a clothes treating apparatus according to another embodiment of the disclosure, particularly, an optical assembly in an embodiment in which an arrangement of a color layer is modified. FIG. 12 is a view illustrating an optical assembly of a clothes treating apparatus according to another embodiment of the disclosure, particularly, an optical assembly in an embodiment in which a shape of a color layer is modified.

An optical assembly of a clothes treating apparatus according to another embodiment of the disclosure will be described with reference to FIGS. 11 and 12. In describing the embodiment illustrated in FIGS. 11 and 12, the same reference numerals are assigned to the same components as those illustrated in FIGS. 1 to 10 and a description thereof is omitted.

Referring to FIGS. 11 and 12, color layers 330a and 330b may be arranged not to be spaced apart from the reflective layer 340 unlike the above-described embodiment.

Referring to FIG. 11, the color layer 330a may be arranged between the pattern layer 320 and the reflective layer 340, and at least a portion of the color layer 330a may be provided to be spaced apart from the pattern layer 320, particularly, the pattern region R1.

Particularly, the color layer 330a may extend in a direction different from the extension direction of the plate 310, and may extend in a direction in parallel to the inclined portion 341 of the reflective layer 340. That is, the color layer 330a may be inclined to be in parallel to the inclination of the inclined portion 341.

In other words, the color layer 330a may extend in a direction different from the radial direction of the door 100. In other words, one side of the color layer 330a may be formed to extend in a direction away from the rear surface of the plate 310.

The color layer 330a may be provided in the form of a thin layer applied to one surface of the inclined portion 341. Particularly, between the pattern region R1 and the inclined portion 341, the color layer 330a may be applied to the front surface of the inclined portion 341.

For example, the color layer 330a may be manufactured by printing the inclined portion 341 using ink. Particularly, the color layer 330a may be manufactured by various printing methods such as screen printing (or silk screen printing), pad printing, or digital printing. Alternatively, the color layer 330a may be manufactured by spraying ink onto one surface of the inclined portion 341 using a spray.

When the inclined portion 341 is manufactured in such a way that one surface of the inner frame 220 is coated with a plating material, the color layer 330a may be printed by applying the ink after the manufacturing process of the inclined portion 341 is finished, that is, after the plating material of the inclined portion 341 is completely dried or cured. Accordingly, it is possible to prevent the color layer 330a from being mixed with the inclined portion 341.

However, the above examples of the method of printing the color layer 330a are merely examples of printing the color layer according to the disclosure, and various methods of printing the color layer 330a may be provided.

Alternatively, the color layer 330a may be formed in various ways. For example, the color layer 330 may be manufactured in a separate component and then attached to the front surface of the inclined portion 341.

The color layer 330a may be provided to form a separation space S2 between the color layer 330a and the pattern region R1. In other words, the separation space S2 may be formed in front of the color layer 330a and behind the pattern region R1.

The separation space S2 may be formed as an air gap in which air is arranged. However, it is not limited thereto, and the separation space S2 may be filled with a material through which light may pass. For example, the separation space S2 may be filled with an optical adhesive material that is provided to transmit light by including a material such as acrylic, silicone, and urethane.

Referring to the embodiment of FIG. 11, the light L1 incident from the outside of the door 100 may be incident on the color layer 330 by sequentially passing through the plate 310, the pattern layer 320, and the separation space S2, and then be reflected by the reflective layer 340. Thereafter, the light L2 reflected by the reflective layer 340 may pass through the color layer 330 and then sequentially pass through the separation space S2, the pattern layer 320, and the plate 310, and then exit to the outside of the door 100.

Referring to FIG. 12, the color layer 330b may be arranged between the pattern layer 320 and the reflective layer 340, and may be provided so as not to be spaced apart from both the pattern layer 320 and the reflective layer 340.

Particularly, the color layer 330b may be provided to fill a space between the pattern region R1 and the inclined portion 341. One surface of the color layer 330b may be in contact with the pattern region R1 of the pattern layer 320 and the other surface of the color layer 330b may be in contact with the inclined portion 341.

In other words, the separation spaces S1 and S2 illustrated in FIGS. 7 to 11 may not be formed in the optical assembly 300 including the color layer 330b as illustrated in FIG. 12.

The color layer 330b may be provided to transmit at least a portion of light transmitted through the pattern region R1 or at least a portion of light reflected by the inclined portion 341.

The color layer 330b may be provided to include various material to transmit at least a portion of the incident light and to convert a wavelength of the light in the process in which the light passes through the color layer 330b.

As described above with reference to FIGS. 7 to 12, the color layers 330, 330a, and 330b may be provided in various ways in the optical assembly of the clothes treating apparatus according to the disclosure. Hereinafter in describing various embodiments of the optical assembly of the clothes treating apparatus according to the disclosure, it will be described on the premise that the color layer 330 is provided in the form of a thin layer arranged on the rear surface of the pattern region R1 as illustrated in FIGS. 7 to 9. However, it is not limited thereto, and in the following embodiments, various types of color layers as illustrated in FIGS. 10 to 12 may be included in the optical assembly.

Figure 13:
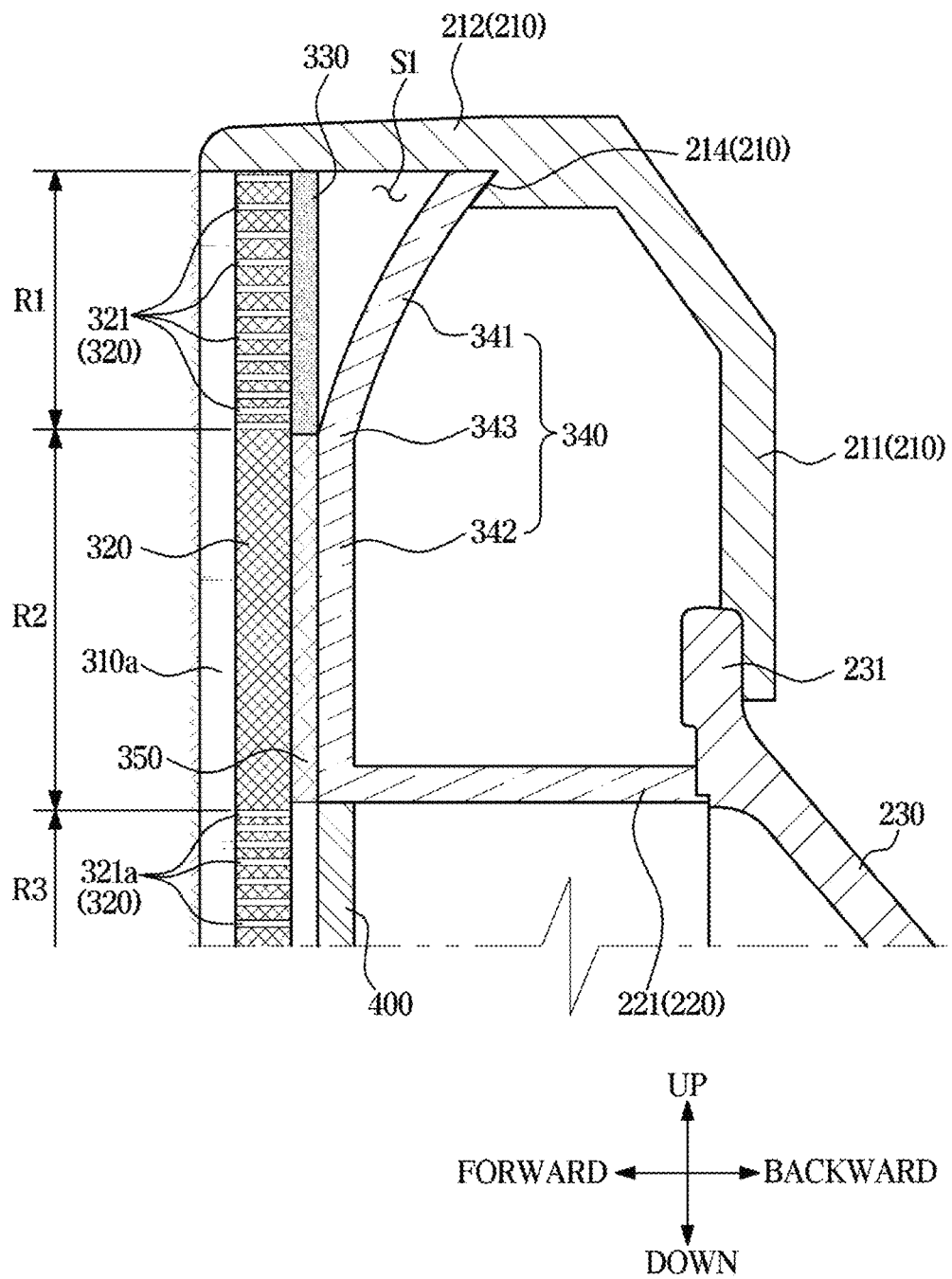
FIG. 13 is a view illustrating an optical assembly of a clothes treating apparatus according to another embodiment of the disclosure, particularly, an optical assembly in an embodiment in which a feature of a plate is modified.

FIG. 13 is a view illustrating an optical assembly of a clothes treating apparatus according to another embodiment of the disclosure, particularly, an optical assembly in an embodiment in which a feature of a plate is modified.

An optical assembly of a clothes treating apparatus according to another embodiment of the disclosure will be described with reference to FIG. 13. In describing the embodiment illustrated in FIG. 13, the same reference numerals are assigned to the same components as those illustrated in FIGS. 1 to 8, and a description thereof may be omitted.

Referring to FIG. 13, one surface of a plate 310a may be provided with irregularities to diffuse or diffusely reflect light incident on the plate 310a. Particularly, the plate 310a may be provided with irregularities formed on one surface thereof in an outer direction of the door 100. A process of processing the smooth plate-shaped plate 310 illustrated in FIGS. 1 to 12 into the plate 310 having irregularities as illustrated in FIG. 13 may be referred to as a haze treatment or a haze method.

The haze treatment may include etching one surface of the plate 310 using an etching solution or spraying a spray.

Accordingly, the plate 310a may diffuse or diffusely reflect incident light, thereby providing an optical effect that is different from that of the optical assembly 300 including the plate 310 illustrated in FIGS. 1 to 12.

Figure 14:
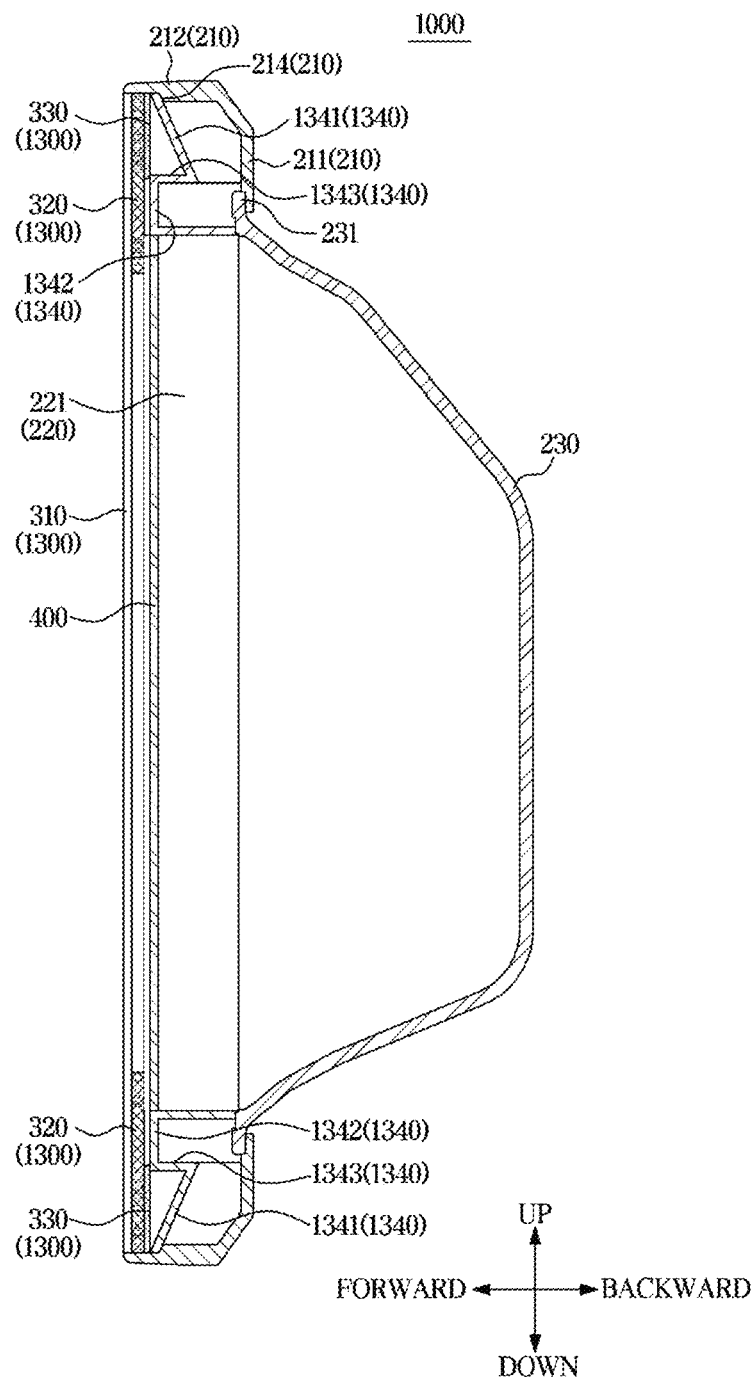
FIG. 14 is a view illustrating an optical assembly of a clothes treating apparatus according to another embodiment of the disclosure, particularly, an optical assembly in an embodiment in which a direction of an inclined portion is modified.

FIG. 14 is a view illustrating an optical assembly of a clothes treating apparatus according to another embodiment of the disclosure, particularly, an optical assembly in an embodiment in which a direction of an inclined portion is modified.

An optical assembly of a clothes treating apparatus according to another embodiment of the disclosure will be described with reference to FIG. 14. In describing the embodiment illustrated in FIG. 14, the same reference numerals are assigned to the same components as those illustrated in FIGS. 1 to 13, and a description thereof may be omitted.

Referring to FIG. 14, a door 1000 of the clothes treating apparatus 1 according to an example of the disclosure may include an optical assembly 1300 provided on one side of the door body.

The door 1000 illustrated in FIG. 14 may include the door body as illustrated in FIGS. 1 to 13, and the feature of the door body illustrated in FIG. 14 corresponds to the feature of the door body 200 illustrated in FIGS. 1 to 13. Accordingly, the door body of FIG. 14 will be described with the same reference numeral '200'.

The optical assembly 1300 may include the plate 310 provided to cover one side of the door body 200, the pattern layer 320 arranged between the plate 310 and the door body 200, the color layer 330 arranged between the pattern layer 320 and the door body 200, and a reflective layer 1340 arranged between the color layer 330 and the door body 200 and including an inclined portion 1341.

The feature of the plate 310, the pattern layer 320, and the color layer 330 of the door 1000 described in FIG. 14 corresponds to the feature of the plates 310 and 310a, the pattern layer 320 and the color layers 330, 330a, and 330b described in FIGS. 1 to 13.

That is, the plate 310 may be provided to transmit light. In addition, the pattern layer 320 may include the optical pattern 321 provided to transmit at least a portion of light transmitted through the plate 310, and may include the pattern region R1 and the blocking region R2. In addition, the color layer 330 may be provided to transmit at least a portion of the light transmitted through the optical pattern 321.

The reflective layer 1340 of the optical assembly 1300 may include the inclined portion 1341 extending in a direction different from the extension direction of the plate 310. The light transmitted through the color layer 330 may be reflected by the inclined portion 1341 and travel toward the plate 310.

At least a portion of the inclined portion 1341 may be inclined to allow at least a portion of one surface facing the color layer 330 to face upward of the door 1000, and at the same time, at least another portion of the inclined portion 1341 may be inclined to allow at least a portion of one surface facing the color layer 330 to face downward of the door 1000.

As for the inclined portion 1341 of FIG. 14, at least a portion of the inclined portion 1341 arranged in the upper portion of the optical assembly 1300 may be inclined to allow at least a portion of one surface facing the color layer 330 to face downward of the door 1000, and at the same time, at least a portion of the inclined portion 1341 arranged in the lower portion of the optical assembly 1300 may be inclined to allow at least a portion of one surface facing the color layer 330 to face upward of the door 1000, which is different from the inclined portion 341 illustrated in FIG. 7.

In other words, at least a portion of the inclined portion 1341 may be formed to be inclined to allow at least a portion of one surface facing the color layer 330 to face an inner direction of the optical assembly 1300.

In other words, the inclined portion 1341 may be formed to be inclined so as to be closer to the rear surface of the plate 310 as the inclined portion 1341 is toward an outer rim of the optical assembly 1300. In addition, the inclined portion 1341 may extend toward the rear of the door 1000 as the inclined portion 1341 is toward an inner side of the radial direction of the optical assembly 1300.

In this case, the optical effect by the optical assembly 1300 may be effective in the lower portion of the optical assembly 1300, but the optical effect by the optical assembly 1300 in the upper portion of the optical assembly 1300 may be less effective than the lower portion of the optical assembly 1300.

However, according to the position of the clothes treating apparatus 1 (particularly, the height at which the clothes treating apparatus 1 is positioned) or the position of an external light source of the clothes treating apparatus 1, the optical effect may be effective in the upper portion of the optical assembly 1300.

The reflective layer 1340 may include a fixer 1342 extending from the inclined portion 1341 and fixing the reflective layer 1340 to the plate 310. The fixer 1342 may extend parallel to the rear surface of the plate 310, and the reflective layer 1340 and the plate 310 may be fixed to each other by the adhesive 350 (refer to FIG. 8).

The reflective layer 1340 may further include a connector 1343 connecting the inclined portion 1341 and the fixer 1342. The connector 1343 may be arranged between one end of the inclined portion 1341 and the other end of the fixer 1342. As for the reflective layer 1340 illustrated in FIG. 14, one end on the inner rim of the inclined portion 1341 may be formed to be farther from the rear surface of the plate 310 than the other end on the outer rim of the inclined portion 1341, and one end on the inner rim of the inclined portion 1341 may be spaced apart from one end on the outer rim of the fixer 1342, which is different from the reflective layer 340 illustrated in FIG. 7. One end of the inner rim of the inclined portion 1341 and one end of the outer rim of the fixer 1342 may be connected by the connector 1343.

Figure 15:
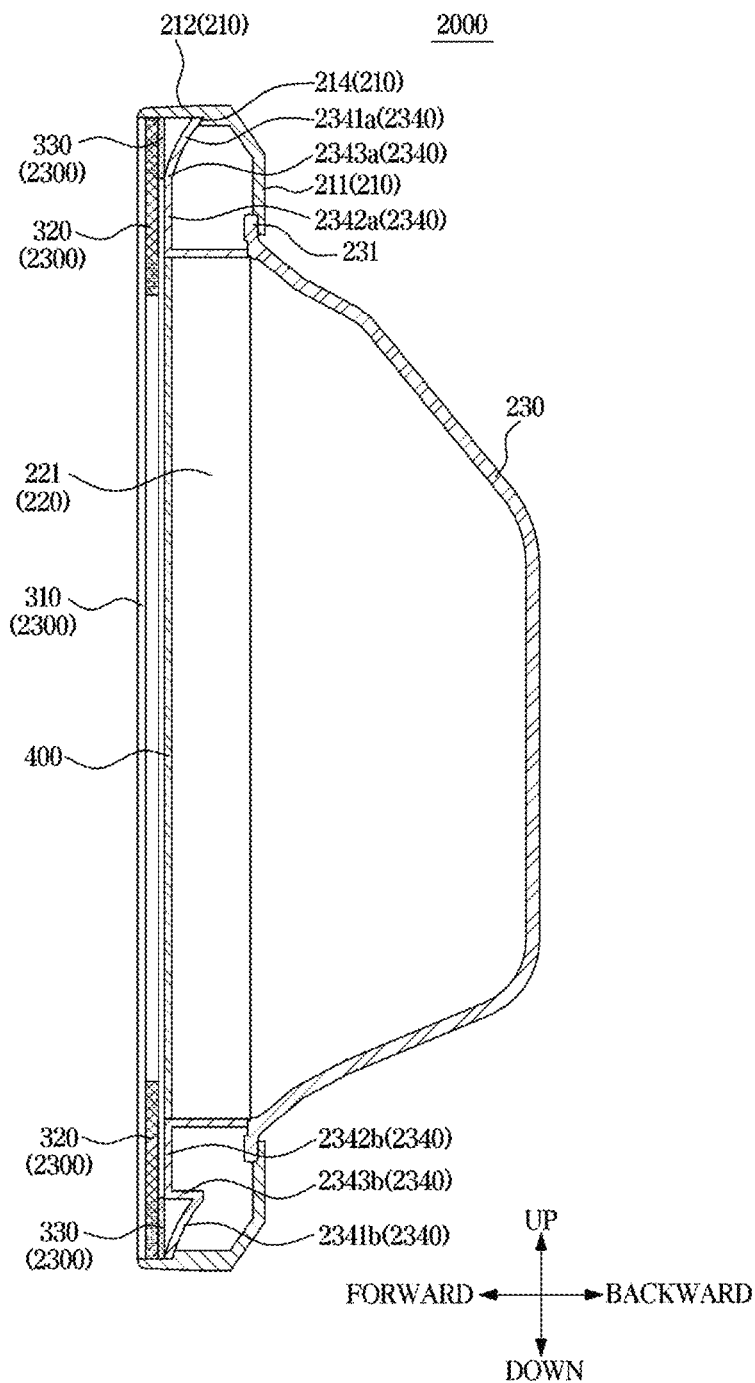
FIG. 15 is a view illustrating an optical assembly of a clothes treating apparatus according to another embodiment of the disclosure, particularly, an optical assembly in an embodiment in which a direction of an inclined portion is modified.
Figure 16:
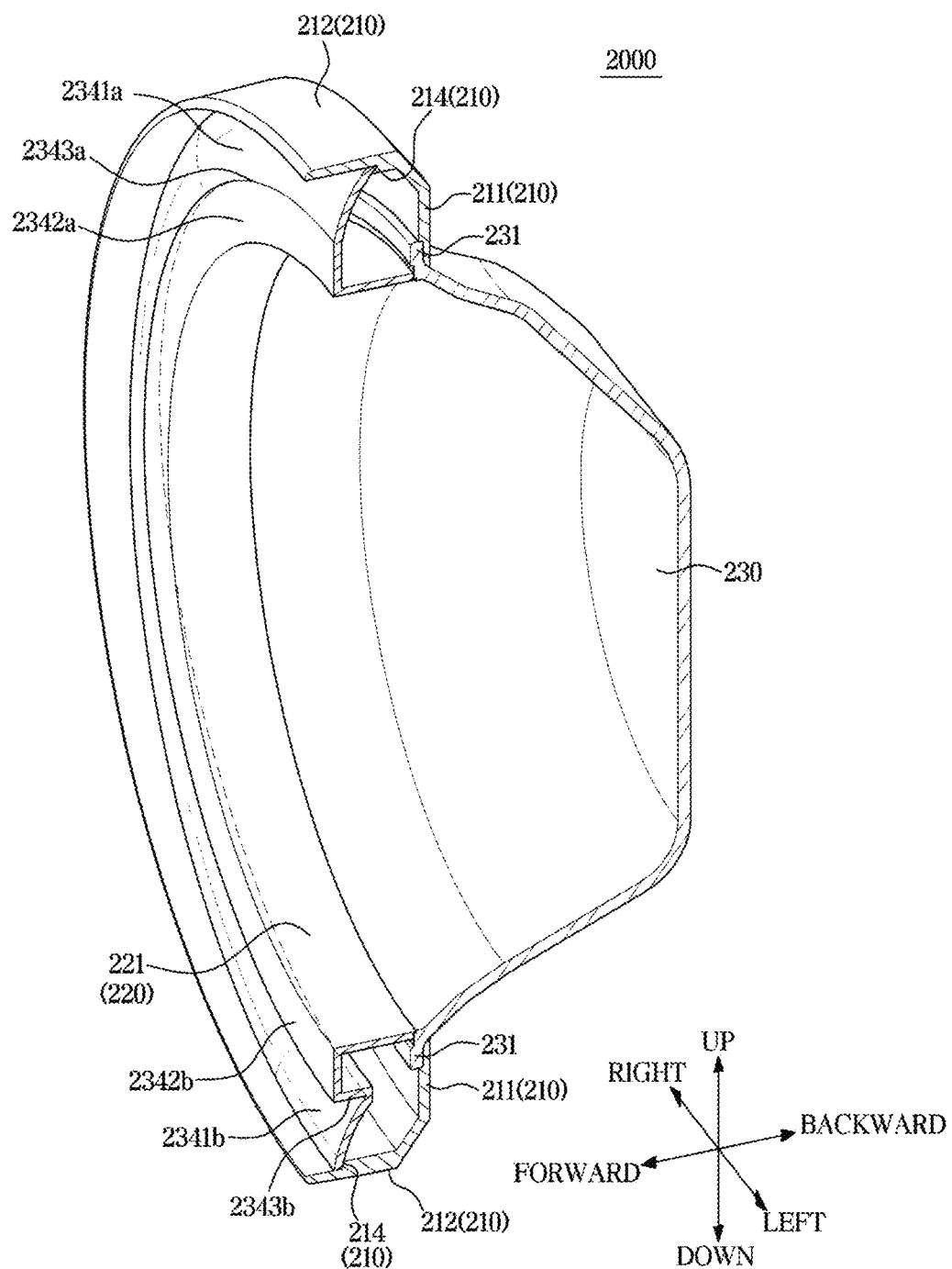
FIG. 16 is a cross-sectional perspective view illustrating one configuration of the optical assembly illustrated in FIG. 15.

FIG. 15 is a view illustrating an optical assembly of a clothes treating apparatus according to another embodiment of the disclosure, particularly, an optical assembly in an embodiment in which a direction of an inclined portion is modified. FIG. 16 is a cross-sectional perspective view illustrating one configuration of the optical assembly illustrated in FIG. 15.

An optical assembly of a clothes treating apparatus according to another embodiment of the disclosure will be described with reference to FIGS. 15 and 16. In describing the embodiment illustrated in FIGS. 15 and 16, the same reference numerals are assigned to the same components as those illustrated in FIGS. 1 to 14, and a description thereof may be omitted.

Referring to FIGS. 15 and 16, a door 2000 of the clothes treating apparatus 1 according to an example of the disclosure may include an optical assembly 2300 provided on one side of the door body.

The door 2000 illustrated in FIGS. 15 and 16 may include the door body as illustrated in FIGS. 1 to 13, and the feature of the door body illustrated in FIGS. 15 and 16 corresponds to the feature of the door body 200 illustrated in FIGS. 1 to 13. Accordingly, the door body of FIGS. 15 and 16 will be described with the same reference numeral '200'.

The optical assembly 2300 may include the plate 310 provided to cover one side of the door body 200, the pattern layer 320 arranged between the plate 310 and the door body 200, the color layer 330 arranged between the pattern layer 320 and the door body 200, and a reflective layer 2340 arranged between the color layer 330 and the door body 200 and including inclined portions 2341a and 2341b.

The feature of the plate 310, the pattern layer 320, and the color layer 330 of the door 2000 described in FIGS. 15 and 16 corresponds to the feature of the plates 310 and 310a, the pattern layer 320 and the color layers 330, 330a, and 330b described in FIGS. 1 to 13.

That is, the plate 310 may be provided to transmit light. In addition, the pattern layer 320 may include the optical pattern 321 provided to transmit at least a portion of light transmitted through the plate 310, and may include the pattern region R1 and the blocking region R2. In addition, the color layer 330 may be provided to transmit at least a portion of the light transmitted through the optical pattern 321.

The reflective layer 2340 of the optical assembly 2300 may include the inclined portions 2341a and 2341b extending in a direction different from the extension direction of the plate 310. The light transmitted through the color layer 330 may be reflected by the inclined portions 2341a and 2341b and travel toward the plate 310.

At least a portion of the inclined portions 2341a and 2341b may be inclined to allow at least a portion of one surface facing the color layer 330 to face upward of the door 2000.

Particularly, as for the inclined portions 2341a and 2341b, at least a portion of the inclined portion 2341a arranged in the upper portion of the optical assembly 2300 may be inclined to allow at least a portion of one surface facing the color layer 330 to face upward of the door 2000. At the same time, at least a portion of the inclined portion 2341b arranged in the lower portion of the optical assembly 2300 may be inclined to allow at least a portion of one surface facing the color layer 330 to face upward of the door 2000.

For example, referring to FIG. 16, the inclined portions 2341a and 2341b including the reflective layer 2340 may be formed to have a substantially annular shape arranged along an outer rim of the optical assembly 2300.

The inclined portion 2341a arranged in the upper portion of the optical assembly 2300 may be referred to as the upper inclined portion 2341a, and the inclined portion 2341b arranged in the lower portion of the optical assembly 2300 may be referred to as the lower inclined portion 2341b.

At least a portion of the upper inclined portion 2341a may be formed to be inclined to allow at least a portion of one surface facing the color layer 330 to face an outer direction of the optical assembly 2300.

In other words, as the upper inclined portion 2341a is toward the outer rim of the optical assembly 2300, the upper inclined portion 2341a may be formed to be inclined to be farther from the rear surface of the plate 310 and may extend toward the rear of the door 2000.

At least a portion of the lower inclined portion 2341b may be formed to be inclined to allow at least a portion of one surface facing the color layer 330 to face an inner direction of the optical assembly 2300.

In other words, the lower inclined portion 2341b may be formed to be inclined to be closer the rear surface of the plate 310 as the lower inclined portion 2341b is toward the outer rim of the optical assembly 2300. In addition, the lower inclined portion 2341b may extend toward the rear of the door 2000 as the lower inclined portion 2341b is toward the inner side of the radial direction of the optical assembly 2300.

The upper inclined portion 2341a and the lower inclined portion 2341b may be integrally formed, but is not limited thereto.

In this case, both the upper and lower portions of the optical assembly 2300 may efficiently produce optical effects by the optical assembly 2300. In addition, optical effects may appear uniformly in the upper and lower portions of the optical assembly 2300.

The reflective layer 2340 may further include an upper fixer 2342a extending from one end of the upper inclined portion 2341a to fix the reflective layer 2340 to the plate 310.

The upper fixer 2342a may extend from one end of an inner rim of the upper inclined portion 2341a. In other words, the upper inclined portion 2341a may be arranged along an outer rim of the upper fixer 2342a.

The upper fixer 2342a may be bent and extended from one end of the upper inclined portion 2341a, and may be formed in parallel to the rear surface of the plate 310. In this case, the upper fixer 2342a may fix the reflective layer 2340 to the plate 310. For example, the adhesive 350 (refer to FIG. 8) may be applied between the upper fixer 2342a and the pattern layer 320 so to fix the reflective layer 2340 to the plate 310.

A portion in which the upper inclined portion 2341a and the upper fixer 2342a are connected may be referred to as a bending member 2343a. In other words, the upper fixer 2342a may be bent and extended from the bending member 2343a that is one end of the upper inclined portion 2341a.

The reflective layer 2340 may include a lower fixer 2342b extending from the lower inclined portion 2341b to fix the reflective layer 2340 to the plate 310. The lower fixer 2342b may extend parallel to the rear surface of the plate 310, and may fix the reflective layer 2340 and the plate 310 to each other by the adhesive 350 (refer to FIG. 8).

The reflective layer 2340 may further include a connector 2343b connecting the lower inclined portion 2341b and the lower fixer 2342b. The connector 2343b may be arranged between one end of the lower inclined portion 2341b and the other end of the lower fixer 2342b. As for the reflective layer 2340 illustrated in FIGS. 15 and 16, one end on the inner rim of the lower inclined portion 2341b may be formed to be farther from the rear surface of the plate 310 than the other end on the outer rim of the lower inclined portion 2341b, and one end on the inner rim of the lower inclined portion 2341b may be spaced apart from one end on the outer rim of the lower fixer 2342b, which is different from the reflective layer 340 illustrated in FIG. 7. One end of the inner rim of the inclined portion 2341b and one end of the outer rim of the lower fixer 2342b may be connected by the connector 2343b.

The upper fixer 2342a and the lower fixer 2342b may extend in parallel to the rear surface of the plate 310 and thus the upper fixer 2342a and the lower fixer 2342b may extend in the same direction as each other.

In addition, the upper fixer 2342a and the lower fixer 2342b may be integrally formed as illustrated in FIG. 16, but is not limited thereto.

A point in which the connector 2343b and the lower inclined portion 2341b come into contact when viewed from the front of the door 2000 may have a more concave shape than the bending member 2343a.

In addition, the bending member 2343a and the connector 2343b may be integrally formed, as illustrated in FIG. 16, but is not limited thereto.

As illustrated in FIG. 16, the reflective layer 2340 may be formed by integrally forming the upper inclined portion 2341a, the lower inclined portion 2341b, the upper fixer 2342a, the lower fixer 2342b, the bending member 2343a, and the connector 2343b. However, it is not limited thereto, and the reflective layer 2340 may be formed in various ways. For example, the reflective layer 2340 may be manufactured in a manner in which a plurality of components, such as an upper portion and a lower portion, are separately formed and then assembled.

Figure 17:
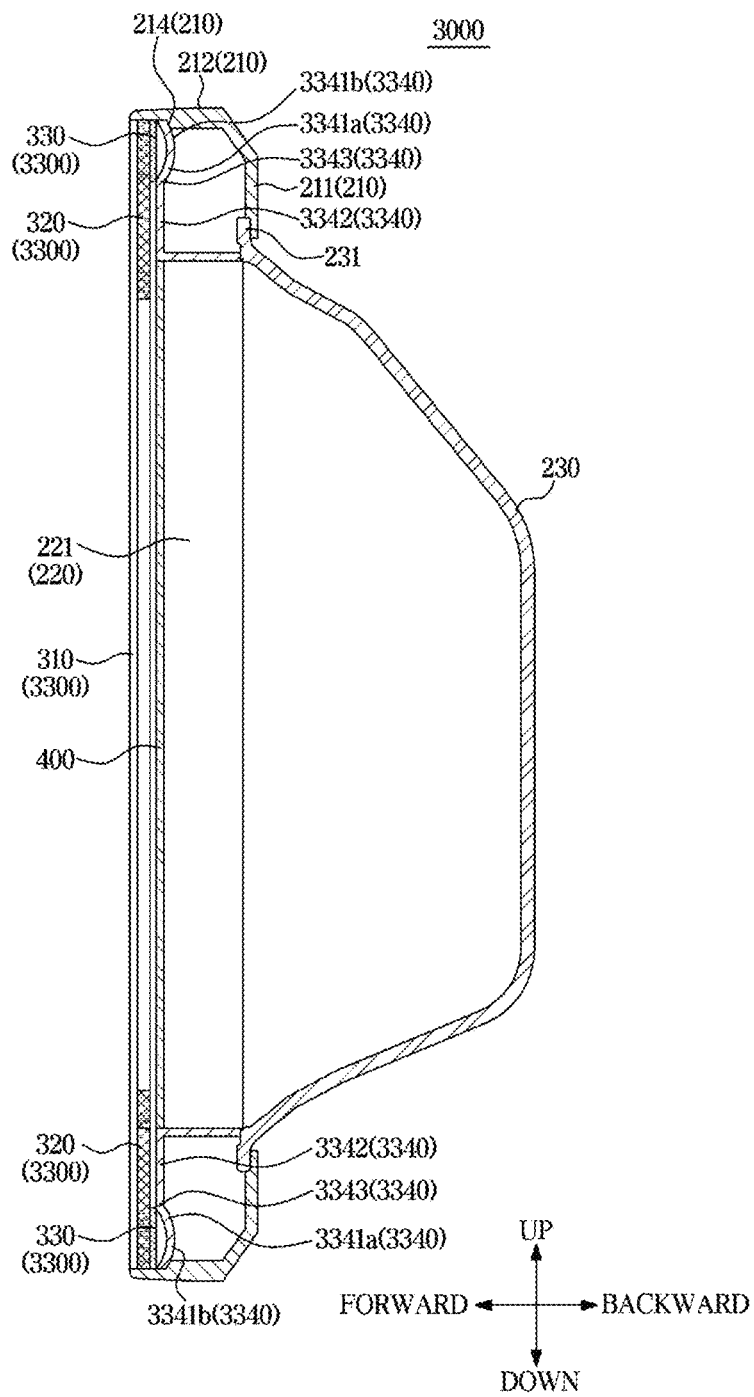
FIG. 17 is a view illustrating an optical assembly of a clothes treating apparatus according to another embodiment of the disclosure, particularly, an optical assembly in an embodiment in which a shape of an inclined portion is modified.

FIG. 17 is a view illustrating an optical assembly of a clothes treating apparatus according to another embodiment of the disclosure, particularly, an optical assembly in an embodiment in which a shape of an inclined portion is modified.

An optical assembly of a clothes treating apparatus according to another embodiment of the disclosure will be described with reference to FIG. 17. In describing the embodiment illustrated in FIG. 17, the same reference numerals are assigned to the same components as those illustrated in FIGS. 1 to 16, and a description thereof may be omitted.

Referring to FIG. 17, a door 3000 of the clothes treating apparatus 1 according to an example of the disclosure may include an optical assembly 3300 provided on one side of the door body.

The door 3000 illustrated in FIG. 17 may include the door body as illustrated in FIGS. 1 to 13, and the feature of the door body illustrated in FIG. 17 corresponds to the feature of the door body 200 illustrated in FIGS. 1 to 13. Accordingly, the door body of FIG. 17 will be described with the same reference numeral '200'.

The optical assembly 3300 may include the plate 310 provided to cover one side of the door body 200, the pattern layer 320 arranged between the plate 310 and the door body 200, the color layer 330 arranged between the pattern layer 320 and the door body 200, and a reflective layer 3340 arranged between the color layer 330 and the door body 200 and including inclined portions 3341a and 3341b.

The feature of the plate 310, the pattern layer 320, and the color layer 330 of the door 3000 described in FIG. 17 corresponds to the feature of the plates 310 and 310a, the pattern layer 320 and the color layers 330, 330a, and 330b described in FIGS. 1 to 13.

That is, the plate 310 may be provided to transmit light. In addition, the pattern layer 320 may include the optical pattern 321 provided to transmit at least a portion of light transmitted through the plate 310, and may include the pattern region R1 and the blocking region R2. In addition, the color layer 330 may be provided to transmit at least a portion of the light transmitted through the optical pattern 321.

The reflective layer 3340 of the optical assembly 3300 may include the inclined portions 3341a and 3341b extending in a direction different from the extension direction of the plate 310. The light transmitted through the color layer 330 may be reflected by the inclined portions 3341a and 3341b and travel toward the plate 310.

At least a portion of the inclined portions 3341a and 3341b may be inclined to allow at least a portion of one surface facing the color layer 330 to face upward of the door 3000, and at the same time, at least another portion of the inclined portions 3341a and 3341b may be inclined to allow at least a portion of one surface facing the color layer 330 to face downward of the door 3000.

At least a portion of the members 3341a and 3341b arranged in the upper portion of the optical assembly 3300 may be inclined to allow at least a portion of one surface facing the color layer 330 to face upward of the door 3000, and to allow at least another portion thereof to face downward of the door 3000. At the same time, at least a portion of the inclined portions 3341a and 3341b arranged in the lower portion of the optical assembly 3300 may be inclined to allow at least a portion of one surface facing the color layer 330 to face upward of the door 3000, and to allow at least another portion thereof to face downward of the door 3000.

Particularly, the inclined portions 3341a and 3341b may include a first inclined portion 3341a, and a second inclined portion 3341b arranged along an outer circumference of the first inclined portion 3341a.

The second inclined portion 3341b may extend from one end of the first inclined portion 3341a to be bent. The second inclined portion 3341b may extend in a direction different from the extension direction of the plate 310 and the extension direction of the first inclined portion 3341a.

Particularly, at least a portion of the first inclined portion 3341a may be inclined to allow at least a portion of a surface facing the color layer 330 to face the outer direction of the optical assembly 3300.

In other words, as the first inclined portion 3341a is toward to the outer rim of the optical assembly 3300, the first inclined portion 3341a may be inclined to be farther from the rear surface of the plate 310 and extend toward the rear side of the door 3000.

Conversely, at least a portion of the second inclined portion 3341b may be formed to be inclined to allow at least a portion of one surface facing the color layer 330 to face an inner direction of the optical assembly 3300.

In other words, the second inclined portion 3341b may be formed to be inclined to be closer to the rear surface of the plate 310 as the second inclined portion 3341b is toward the outer rim of the optical assembly 3300. In addition, the second inclined portion 3341b may extend toward the rear of the door 3000 as the second inclined portion 3341b is toward the inner side of the radial direction of the optical assembly 3300.

In this case, at least a portion of the first inclined portion 3341a arranged in the upper portion of the optical assembly 3300 may be inclined to allow at least a portion of one surface facing the color layer 330 to face upward of the door 3000. Conversely, at least a portion of the second inclined portion 3341b arranged in the upper portion of the optical assembly 3300 may be inclined to allow at least a portion of one surface facing the color layer 330 to face downward of the door 3000.

Further, at least a portion of the second inclined portion 3341b arranged in the lower portion of the optical assembly 3300 may be inclined to allow at least a portion of one surface facing the color layer 330 to face upward of the door 3000. Conversely, at least a portion of the first inclined portion 3341a arranged in the lower portion of the optical assembly 3300 may be inclined to allow at least a portion of one surface facing the color layer 330 to face downward of the door 3000.

In this case, both the upper and lower portions of the optical assembly 3300 may produce optical effects efficiently. In addition, optical effects may appear uniformly in the upper and lower portions of the optical assembly 3300.

The reflective layer 3340 or the inclined portions 3341a and 3341b illustrated in FIG. 17 may be formed to have a substantially annular shape arranged along the outer rim of the optical assembly 3300.

In comparison with the reflective layer 2340 according to the embodiment illustrated in FIGS. 15 and 16, the reflective layer 3340 according to the embodiment illustrated in FIG. 17 may have a constant shape along the outer circumference of the optical assembly 3300, and thus it is easier to design or manufacture the reflective layer 3340 and it is possible to reduce the manufacturing cost and time.

The reflective layer 3340 may further include a fixer 3342 extending from one end of the first inclined portion 3341a and provided to fix the reflective layer 3340 to the plate 310.

The fixer 3342 may extend from one end of the inner rim of the first inclined portion 3341a. In other words, the first inclined portion 3341a may be arranged along the outer rim of the fixer 3342.

The fixer 3342 may be bent from one end of the first inclined portion 3341a and formed in parallel to the rear surface of the plate 310. The fixer 3342 may fix the reflective layer 340 to the plate 310. For example, the adhesive 350 (refer to FIG. 8) may be applied between the fixer 3342 and the pattern layer 320 to fix the reflective layer 3340 to the plate 310.

A portion, in which the first inclined portion 3341a is connected to the fixer 3342, may be referred to as a bending member 3343. In other words, the fixer 3342 may be bent and extended from the bending member 3343 that is one end of the first inclined portion 3341a.

The first inclined portion 3341a and the second inclined portion 3341b may be formed to include a curved inclined surface.

Figure 18:
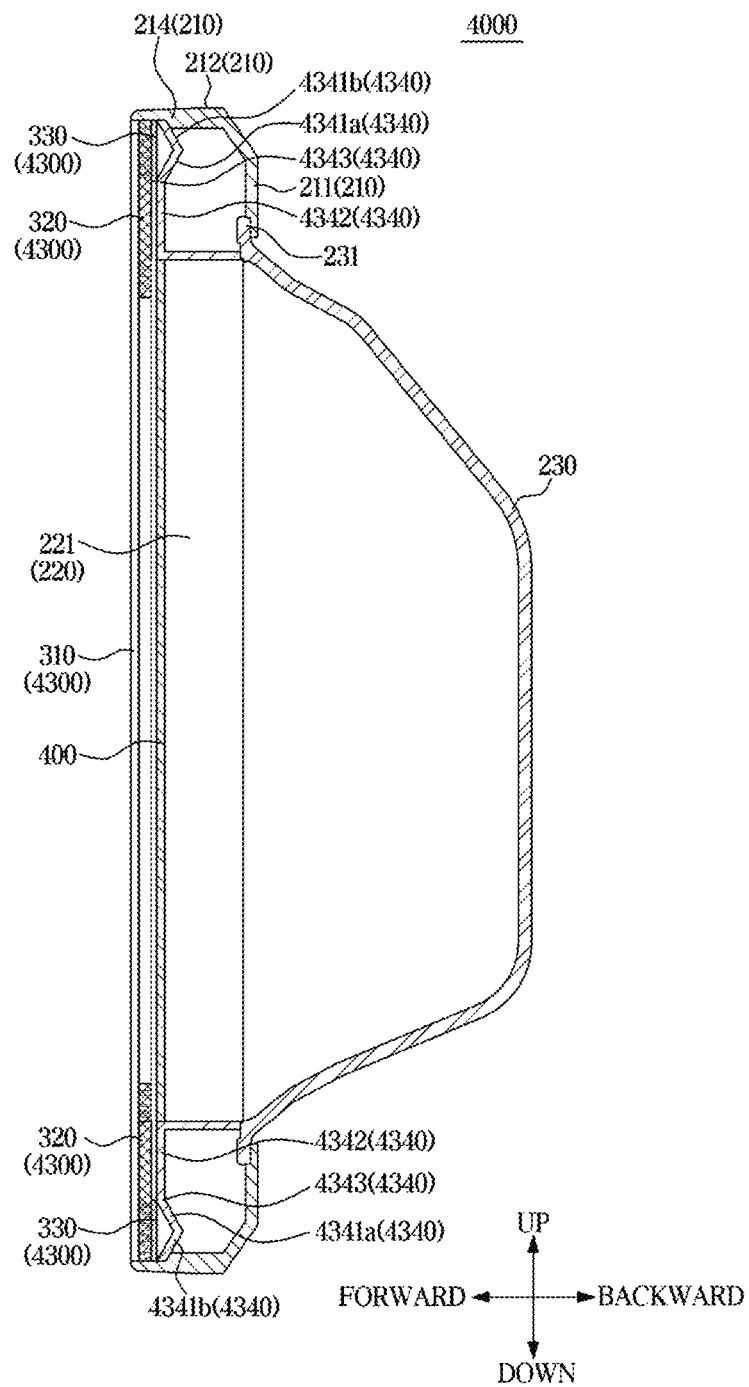
FIG. 18 is a view illustrating an optical assembly of a clothes treating apparatus according to another embodiment of the disclosure, particularly, an optical assembly in an embodiment in which a shape of an inclined portion is modified.

FIG. 18 is a view illustrating an optical assembly of a clothes treating apparatus according to another embodiment of the disclosure, particularly, an optical assembly in an embodiment in which a shape of an inclined portion is modified.

An optical assembly of a clothes treating apparatus according to another embodiment of the disclosure will be described with reference to FIG. 18. In describing the embodiment illustrated in FIG. 18, the same reference numerals are assigned to the same components as those illustrated in FIGS. 1 to 17, and a description thereof may be omitted.

Referring to FIG. 18, a door 4000 of the clothes treating apparatus 1 according to an example of the disclosure may include an optical assembly 4300 provided on one side of the door body.

The door 4000 illustrated in FIG. 18 may include the door body as illustrated in FIGS. 1 to 13, and the feature of the door body illustrated in FIG. 18 corresponds to the feature of the door body 200 illustrated in FIGS. 1 to 13. Accordingly, the door body of FIG. 18 will be described with the same reference numeral '200'.

The optical assembly 4300 may include the plate 310 provided to cover one side of the door body 200, the pattern layer 320 arranged between the plate 310 and the door body 200, the color layer 330 arranged between the pattern layer 320 and the door body 200, and a reflective layer 4340 arranged between the color layer 330 and the door body 200 and including inclined portions 4341a and 4341b.

The feature of the plate 310, the pattern layer 320, and the color layer 330 of the door 4000 described in FIG. 18 corresponds to the feature of the plates 310 and 310a, the pattern layer 320 and the color layers 330, 330a, and 330b described in FIGS. 1 to 13.

That is, the plate 310 may be provided to transmit light. In addition, the pattern layer 320 may include the optical pattern 321 provided to transmit at least a portion of light transmitted through the plate 310, and may include the pattern region R1 and the blocking region R2. In addition, the color layer 330 may be provided to transmit at least a portion of the light transmitted through the optical pattern 321.

The reflective layer 4340 of the optical assembly 4300 may include the inclined portions 4341a and 4341b extending in a direction different from the extension direction of the plate 310. The light transmitted through the color layer 330 may be reflected by the inclined portions 4341a and 4341b and travel toward the plate 310.

At least a portion of the inclined portions 4341a and 4341b may be inclined to allow at least a portion of one surface facing the color layer 330 to face upward of the door 4000, and at the same time, at least another portion of the inclined portions 4341a and 4341b may be inclined to allow at least a portion of one surface facing the color layer 330 to face downward of the door 4000.

At least a portion of the members 4341a and 4341b arranged in the upper portion of the optical assembly 4300 may be inclined to allow at least a portion of one surface facing the color layer 330 to face upward of the door 4000, and at least another portion thereof may be inclined to allow at least a portion of one surface facing the color layer 330 to face downward of the door 4000. At the same time, at least a portion of the inclined portions 4341a and 4341b arranged in the lower portion of the optical assembly 4300 may be inclined to allow at least a portion of one surface facing the color layer 330 to face upward of the door 4000, and at least another portion thereof may be inclined to allow at least a portion of one surface facing the color layer 330 to face downward of the door 4000.

Particularly, the inclined portions 4341a and 4341b may include a first inclined portion 4341a, and a second inclined portion 4341b arranged along an outer circumference of the first inclined portion 4341a.

The second inclined portion 4341b may extend from one end of the first inclined portion 4341a to be bent. The second inclined portion 4341b may extend in a direction different from the extension direction of the plate 310 and the extension direction of the first inclined portion 4341a.

Particularly, at least a portion of the first inclined portion 4341a may be inclined to allow at least a portion of a surface facing the color layer 330 to face the outer direction of the optical assembly 4300.

In other words, as the first inclined portion 4341a is toward the outer rim of the optical assembly 4300, the first inclined portion 4341a may be inclined to be farther from the rear surface of the plate 310 and extend toward the rear side of the door 4000.

Conversely, at least a portion of the second inclined portion 4341b may be formed to be inclined to allow at least a portion of one surface facing the color layer 330 to face an inner direction of the optical assembly 4300.

In other words, the second inclined portion 4341b may be formed to be inclined so as to be closer to the rear surface of the plate 310 as the second inclined portion 4341b is toward the outer rim of the optical assembly 4300. In addition, the second inclined portion 4341b may extend toward the rear of the door 4000 as the second inclined portion 4341b is toward the inner side of the optical assembly 4300 in the radial direction.

In this case, at least a portion of the first inclined portion 4341a arranged in the upper portion of the optical assembly 4300 may be inclined to allow at least a portion of one surface facing the color layer 330 to face upward of the door 4000. Conversely, at least a portion of the second inclined portion 4341b arranged in the upper portion of the optical assembly 4300 may be inclined to allow at least a portion of one surface facing the color layer 330 to face downward of the door 4000.

Further, at least a portion of the second inclined portion 4341b arranged in the lower portion of the optical assembly 4300 may be inclined to allow at least a portion of one surface facing the color layer 330 to face upward of the door 4000. Conversely, at least a portion of the first inclined portion 4341a arranged in the lower portion of the optical assembly 4300 may be inclined to allow at least a portion of one surface facing the color layer 330 to face downward of the door 4000.

In this case, both the upper and lower portions of the optical assembly 4300 may produce optical effects efficiently. In addition, optical effects may appear uniformly in the upper and lower portions of the optical assembly 4300.

The reflective layer 4340 or the inclined portions 4341a and 4341b illustrated in FIG. 18 may be formed to have a substantially annular shape arranged along the outer rim of the optical assembly 4300.

In comparison with the reflective layer 2340 according to the embodiment illustrated in FIGS. 15 and 16, the reflective layer 4340 according to the embodiment illustrated in FIG. 18 may have a constant shape along the outer circumference of the optical assembly 4300, and thus it is easier to design or manufacture the reflective layer 4340, and it is possible to reduce the manufacturing cost and time.

The reflective layer 4340 may further include a fixer 4342 extending from one end of the first inclined portion 4341a and provided to fix the reflective layer 4340 to the plate 310.

The fixer 4342 may extend from one end of the inner rim of the first inclined portion 4341a. In other words, the first inclined portion 4341a may be arranged along the outer rim of the fixer 4342.

The fixer 4342 may be bent from one end of the first inclined portion 4341a and formed in parallel to the rear surface of the plate 310. The fixer 4342 may fix the reflective layer 340 to the plate 310. For example, the adhesive 350 (refer to FIG. 8) may be applied between the fixer 4342 and the pattern layer 320 to fix the reflective layer 4340 to the plate 310.

A portion, in which the first inclined portion 4341a is connected to the fixer 4342, may be referred to as a bending member 4343. In other words, the fixer 4342 may be bent and extended from the bending member 4343 that is one end of the first inclined portion 4341a.

The first inclined portion 4341a and the second inclined portion 4341b may be formed to include an inclined surface having a constant inclination angle.

In this case, the fact that the inclined portions 4341a and 4341b including the inclined surface having a constant inclination angle illustrated in FIG. 18 have different optical effects in comparison with the inclined portions 3341a and 3341b including the curved inclined surface illustrated in FIG. 17 may correspond to the above description in FIGS. 7 to 9.

In the above description, embodiments in which the optical assembly is provided on the door of the clothes treating apparatus according to the disclosure have been described.

However, the disclosure is not limited to the above-mentioned embodiments.

For example, the above embodiments have been described based on that the optical assembly 300, 1300, 2300, 3300, or 4300 is arranged along the outer rim of the door 100, 1000, 2000, 3000, or 4000 of the front-loading type clothes treating apparatus 1. However, the configuration, to which the optical assembly according to the disclosure is applied, is not limited thereto.

Accordingly, the optical assembly according to the disclosure may not be provided along the outer rim of the door, and may be provided at various positions on the door to provide various optical effects to the outside of the door.

Alternatively, the optical assembly according to the disclosure may be applied to a door of a top-loading type clothes treating apparatus or to a door of other home appliances other than the clothes treating apparatus.

Alternatively, the optical assembly according to the disclosure may be applied to a component other than the door of the home appliance, such as a panel forming at least one surface of a main body.

Hereinafter an embodiment in which the optical assembly according to the disclosure is applied to home appliances other than the clothes treating apparatus will be described.

Figure 19:
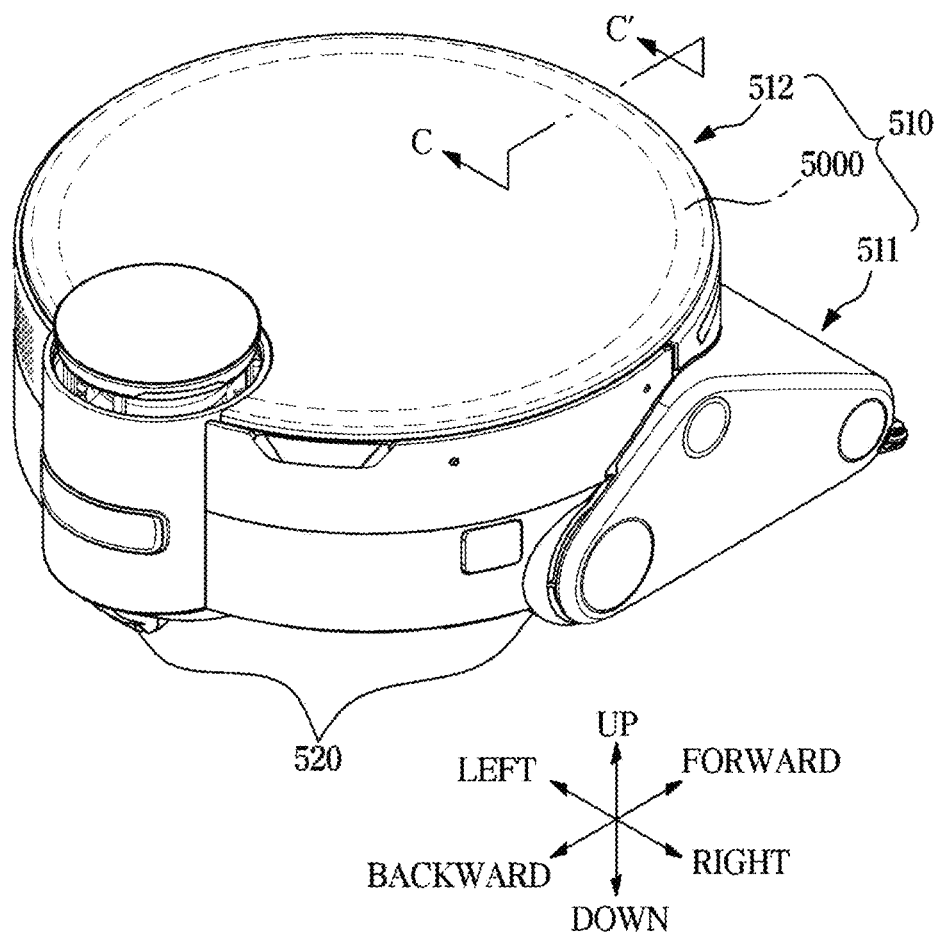
FIG. 19 is a perspective view illustrating a robot cleaner, which is a type of the home appliance according to another embodiment of the disclosure.
Figure 20:
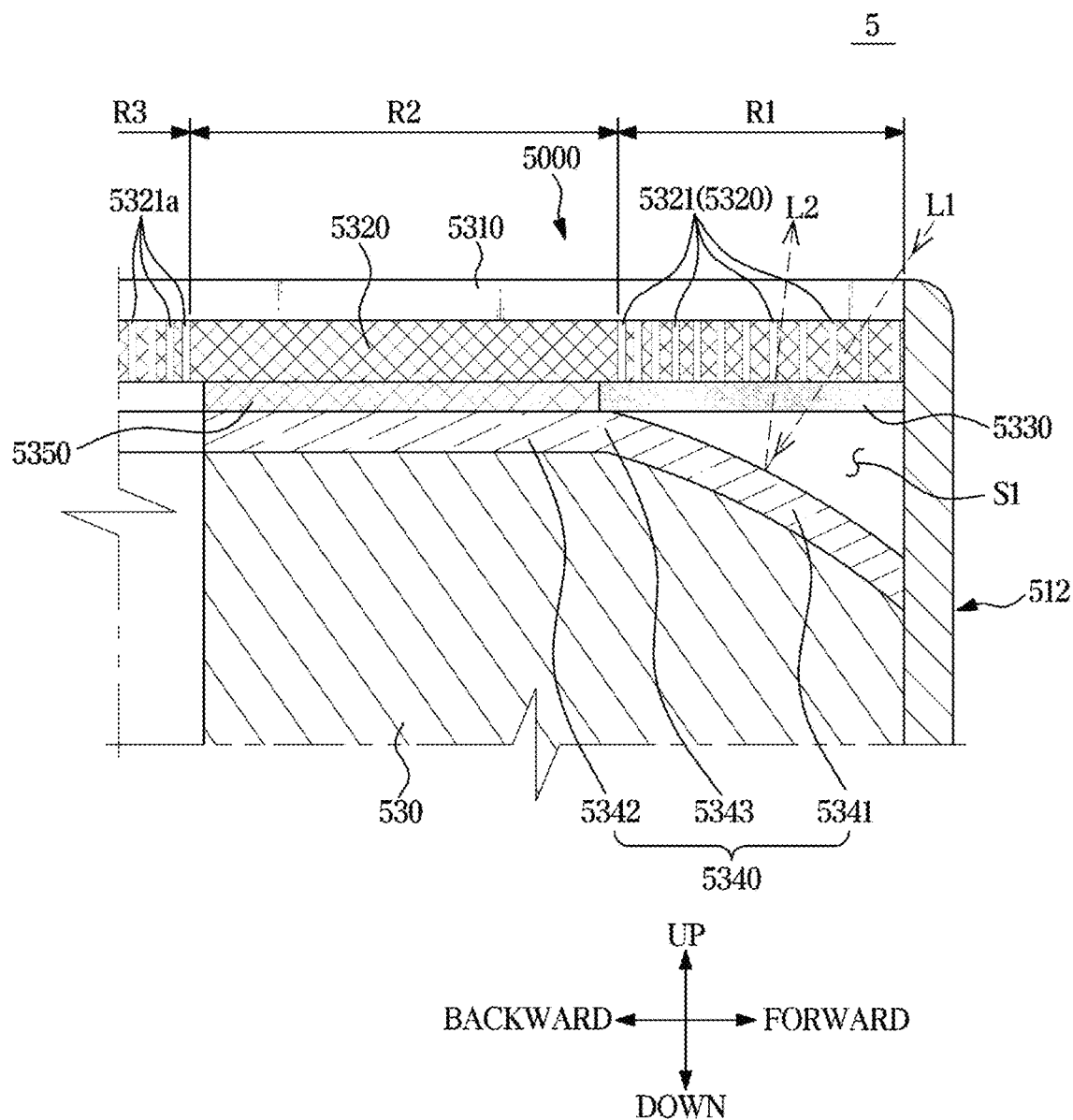
FIG. 20 is an enlarged cross-sectional view taken along a line C-C' of FIG. 19.
Figure 21:
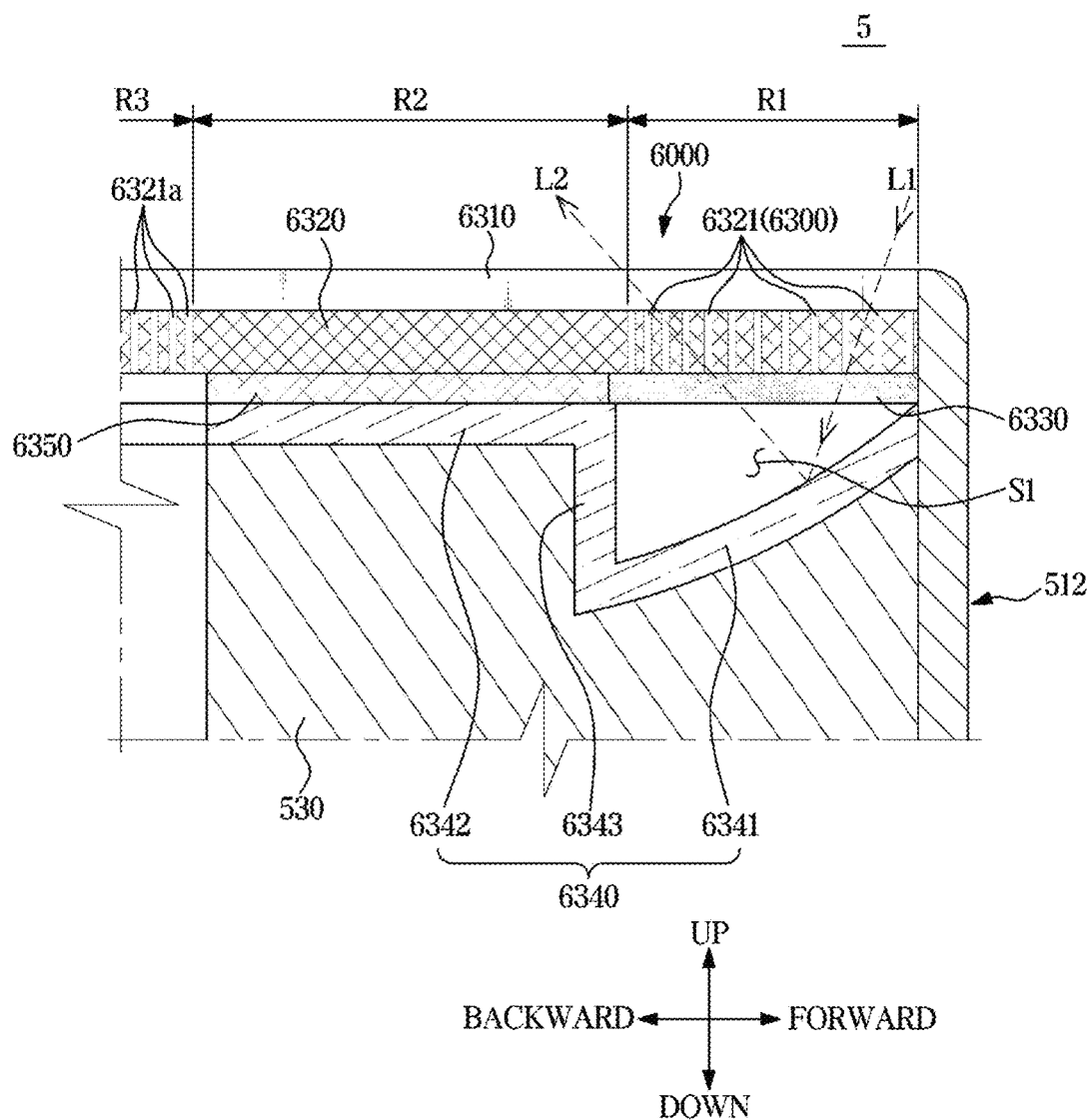
FIG. 21 is a cross-sectional view illustrating an optical assembly of the robot cleaner according to an embodiment different from FIG. 20.

FIG. 19 is a perspective view illustrating a robot cleaner, which is a type of the home appliance according to another embodiment of the disclosure. FIG. 20 is an enlarged cross-sectional view taken along a line C-C' of FIG. 19. FIG. 21 is a cross-sectional view illustrating an optical assembly of the robot cleaner according to an embodiment different from FIG. 20.

Referring to FIGS. 19 to 21, a home appliance according to the disclosure may include a robot cleaner 5.

The robot cleaner 5 is a device that cleans dust accumulated on a floor while traveling in a cleaning region without user manipulation. The robot cleaner 5 may clean the cleaning region without exception by controlling a driving device, and efficiently remove dust and the like by controlling a cleaning device.

Particularly, the robot cleaner 5 may include a cleaner body 510 and a driving unit 520 configured to travel in a cleaning region.

The cleaner body 510 may form an exterior of the robot cleaner 5 and may accommodate various parts of the robot cleaner 5. For example, the cleaner body 510 may accommodate a brush (not shown) provided to suck foreign substances on a surface to be cleaned, a suction motor (not shown) configured to generate suction power, a filter (not shown), a dust collector (not shown), and a battery (not shown).

The driving unit 520 may be coupled to the cleaner body 510 and include at least one wheel to drive in the cleaning region. The wheel of the driving unit 520 may be configured to be rotated by a driving motor (not shown), and the driving motor may be controlled by a processor of the robot cleaner 5.

The cleaner body 510 may include a first case 511 provided to which the driving unit 520 is coupled, and provided to suck foreign substances on the surface to be cleaned by generating a suction force, and a second case 512 provided to cover an upper portion of the first case 511.

The above-mentioned brush, motor, filter, dust collector and battery of the robot cleaner 5 may be accommodated in the first case 511.

The second case 512 may form an upper surface of the cleaner body 510. As illustrated in FIG. 19, the second case 512 may have a substantially flat outer surface. However, the shape of the second case 512 is not limited thereto, and the second case 512 may include a curved member on at least a part of the outer surface.

FIG. 19 illustrates that the first case 511 and the second case 512 are separated from each other, but is not limited thereto. Alternatively, the first case 511 and the second case 512 may be integrally formed with each other.

Referring to FIGS. 19 to 21, the robot cleaner 5 may include an optical assembly 5000 according to an example of the disclosure. Particularly, the optical assembly 5000 may be provided in the second case 512 to provide an optical effect to the upper side of the cleaner body 510.

FIG. 20 is a view illustrating an example of the optical assembly 5000 applied to the robot cleaner 5, and is a cross-sectional view of a part of the outer side of the second case 512 illustrated in FIG. 19 taken along a line C-C'.

Referring to FIG. 20, the second case 512 may include the optical assembly 5000 provided on one side thereof.

The optical assembly 5000 may include a plate 5310 arranged in an upper portion of the second case 512, a pattern layer 5320 arranged below the plate 5310, a color layer 5330 arranged below the pattern layer 5320, and a reflective layer 5340 arranged below the color layer 5330.

The plate 5310 may form an upper surface of the second case 512. However, the disclosure does not exclude an example in which a separate component (not shown) is arranged on the upper side of the plate 5310.

The plate 5310 may be provided to transmit light. Particularly, the plate 5310 may include a transparent material such as glass or transparent resin. However, it is not limited thereto, and the plate 5310 may include various materials through which light passes.

The plate 5310 may have a substantially flat plate shape. In this case, it is possible to reduce cost or time in manufacturing the plate 5310. However, the shape of the plate 5310 is not limited thereto, which is the same as the description with reference to FIGS. 1 to 18.

The pattern layer 5320 may be arranged on a rear surface of the plate 5310. As described with reference to FIGS. 1 to 18, the pattern layer 5320 may be applied to the rear surface of the plate 5310, and may be formed by various methods such as printing with ink.

The pattern layer 5320 may include an optical pattern 5321 provided to transmit at least a portion of light transmitted through the plate 5310. The optical pattern 5321 may have various shapes, such as a plurality of holes. The shape of the optical pattern 5321 and the method of forming the optical pattern 5321 on the pattern layer 5320 are the same as those described with reference to FIGS. 1 to 18.

The pattern layer 5320 may include a pattern region R1 and a blocking region R2. The optical pattern 5321 may be formed in the pattern region R1 so as to transmit at least a portion of the light transmitted through the plate 5310. The blocking region R2 may cover the rear surface of the plate 5310 to block at least another portion of the light transmitted through the plate 5310.

In addition, the pattern layer 5320 may further include a sub-pattern region R3 arranged on the inner side than the blocking region R2 with respect to a radial direction of the optical assembly 5000. A sub-optical pattern 5321*a* formed to transmit light may be provided in the sub-pattern region R3. Descriptions of the sub-optical pattern 5321*a* and the sub-pattern region R3 are the same as those described with reference to FIGS. 1 to 18.

The color layer 5330 may be arranged on the rear surface of the pattern layer 5320. The color layer 5330 may be applied to the rear surface of the pattern layer 5320 and may be formed by various methods such as printing with ink as described with reference to FIGS. 1 to 18.

Particularly, the color layer 5330 may be provided to cover at least the rear surface of the pattern region R1.

The color layer 5330 may be provided to transmit at least a portion of the light transmitted through the optical pattern 5321. While at least a portion of the light transmitted through the optical pattern 5321 is transmitted through the color layer 5330, the color layer 5330 may convert a wavelength of the at least a portion of the light.

The reflective layer 5340 may be provided to reflect the light, which is transmitted through the color layer 5330, toward the plate 5310.

The reflective layer 5340 may include a material having high reflectivity.

For example, as illustrated in FIG. 20, an inner frame 530 may be provided inside the cleaner body 510 to support the cleaner body 510 or various components.

The reflective layer 5340 may be formed in the form of a thin layer in which a material having high reflectivity is applied to one surface of the inner frame 530. The shape of the inner frame 530 is not limited to that illustrated in FIG. 20, and the manufacturing method of the reflective layer 5340 is the same as described with reference to FIGS. 1 to 18.

The reflective layer 5340 may include an inclined portion 5341 extending in a direction different from an extension direction of the plate 5310.

The inclined portion 5341 may be arranged below the pattern region R1 and the color layer 5330. Accordingly, light L1 incident from the outside of the robot cleaner 5 may sequentially pass through the plate 5310, the pattern layer 5320 (particularly, the pattern region R1), and the color layer 5330, and then be reflected by the inclined portion 5341. Light L2 reflected by the inclined portion 5341 may sequentially pass through the color layer 5330, the pattern layer 5320, and the plate 5310 and be emitted to the outside of the robot cleaner 5, and thus it is possible to provide the optical effect.

The inclined portion 5341 may extend in a direction away from the rear surface of the plate 5310 as the inclined portion 5341 is toward the outer rim thereof. In other words, the inclined portion 5341 may be inclined to allow at least a portion of one surface facing the color layer 5330 to face the outer direction.

The reflective layer 5340 may include an extension portion 5342 extending from one end of the inclined portion 5341 to be bent. The extension portion 5342 may be arranged in parallel to the rear surface of the plate 5310 and coupled to the rear surface of the plate 5310 by an adhesive 5350. Accordingly, the extension portion 5342 may be referred to as a fixer 5342.

The reflective layer 5340 may include a bending member 5343 positioned between the inclined portion 5341 and the extension portion 5342. In other words, the extension portion 5342 may be bent and extended from the bending member 5343 that is one end of the inclined portion 5341.

An inner edge of the pattern region R1 may be arranged in the direction of the outer edge of the optical assembly 5000 rather than the bending member 5343. A description thereof is as described in FIGS. 1 to 18.

FIG. 21 is a view illustrating an optical assembly 6000 according to an example different from that of FIG. 20, and is a cross-sectional view of a part of the outer side of the second case 512 illustrated in FIG. 19 taken along a line C-C'.

In describing the optical assembly 6000 that is an example of the disclosure with reference to FIG. 21, the same reference numerals are assigned to the same components as those of FIG. 20 and a description thereof is omitted.

Referring to FIG. 21, the second case 512 may include the optical assembly 6000 provided on one side thereof.

The optical assembly 6000 may include a plate 6310 arranged in the upper portion the second case 512, a pattern layer 6320 arranged below the plate 6310, and a color layer 6330 arranged below the pattern layer 6320, and a reflective layer 6340 arranged below the color layer 6330.

A description of the plate 6310, the pattern layer 6320, an optical pattern 6321, and the color layer 6330 of the optical assembly 6000 may be the same as the description of the plate 5310, the pattern layer 5320, the optical pattern 5321, and the color layer 5330 of the optical assembly 5000 of FIG. 20.

The reflective layer 6340 may be provided to reflect light transmitted through the color layer 6330 toward the plate 6310.

The reflective layer 6340 may include an inclined portion 6341 extending in a direction different from an extension direction of the plate 6310.

The inclined portion 6341 may be arranged below the pattern region R1 and the color layer 6330. Accordingly, light L1 incident from the outside of the robot cleaner 5 may sequentially pass through the plate 6310, the pattern layer 6320 (particularly, the pattern region R1), and the color layer 6330, and then be reflected by the inclined portion 6341. Light L2 reflected by the inclined portion 6341 may sequentially pass through the color layer 6330, the pattern layer 6320, and the plate 6310 and be emitted to the outside of the robot cleaner 5, and thus it is possible to provide the optical effect.

The inclined portion 6341 may extend in a direction away from the rear surface of the plate 6310 as the inclined portion 6341 is toward the outer rim thereof. In other words, the inclined portion 6341 may be inclined to allow at least a portion of one surface facing the color layer 6330 to face the inner direction.

The direction of the inclined portion 6341 of FIG. 21 may be different from that of the inclined portion 5341 of FIG. 20, and thus the optical effect appearing to the outside of the robot cleaner 5 may be different.

The reflective layer 6340 may include a fixer 6342 extending from the inclined portion 6341 and provided to fix the reflective layer 6340 to the plate 6310. The fixer 6342 may be arranged in parallel to the rear surface of the plate 6310 and coupled to the rear surface of the plate 6310 by an adhesive 6350.

The reflective layer 6340 may include a connector 6343 provided to connect the inclined portion 6341 and the fixer 6342 to each other.

An inner edge of the pattern region R1 may be arranged in a direction of the outer edge of the optical assembly 6000 rather than the connector 6343.

In the above, the configurations in which the optical assembly 5000 or 6000 is applied to the robot cleaner 5, which is a kind of home appliance according to the disclosure, have been described with reference to FIGS. 19 to 21.

As the optical assembly 5000 or 6000 is applied to the robot cleaner 5, the optical effect may be provided to the upper side of the second case 512 of the robot cleaner 5, and an aesthetic feeling or a three-dimensional effect may be provided to a user.

Particularly, the robot cleaner 5 may travel in the cleaning region by the driving unit 520, and thus even when a user does not move, various optical effects may be provided as the direction of the eyes looking at the robot cleaner 5 is different. In addition, the three-dimensional effect or aesthetic feeling provided to the user may be further improved.

Meanwhile, the embodiments illustrated in FIGS. 19 to 21 are merely examples of the robot cleaner of the home appliance according to the disclosure, but are not limited thereto.

The color layers 300, 300*a*, and 300*b* according to various embodiments described in FIGS. 1 to 18 may also be applied to the optical assemblies of FIGS. 19 to 21.

For example, it is illustrated that a separation space S1 is formed between the color layers 5330 and 6330 and the reflective layers 5341 and 6341 in FIGS. 19 to 21, but is not limited thereto.

In addition, the reflective layer 340, 1340, 2340, 3340, and 4340 according to various embodiments described in FIGS. 1 to 18 may also be applied to the optical assemblies of FIGS. 19 to 21.

As is apparent from the above description, a door of a clothes treating apparatus may include a reflective layer provided to reflect at least a portion of light transmitted through a plate, a pattern layer, and a color layer, and thus it is possible to generate an optical effect and provide an aesthetic feeling to a user, thereby improving quality of appearance of the product.

Further, a door of a clothes treating apparatus may reflect light incident from an external light source without a separate light source, so as to provide an optical effect. Accordingly, it is possible to reduce manufacturing cost or power consumption cost.

Further, a door of a clothes treating apparatus may include a reflective layer including an inclined portion, and thus even when a component, such as a plate, is manufactured in a flat plate shape, it is possible to provide an optical effect and to reduce manufacturing cost.

Although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A clothes treating apparatus comprising:
   a main body including an inlet port on a front surface of the main body;
   a tub inside the main body so that items are receivable into an inside of the tub through the inlet port; and
   a door rotatably coupled to the main body to open and close the inlet port, the door including:
   a door body,
   a plate that covers a side of the door body that, when the inlet port is closed by the door, is a front side of the door body, and provided to transmit light,
   a pattern layer between the plate and the door body and including an optical pattern that transmits at least a portion of light transmitted through the plate,
   a color layer between the pattern layer and the door body and that transmits at least a portion of light transmitted through the optical pattern, and
   a reflective layer between the color layer and the door body and that reflects light transmitted through the color layer toward the plate, the reflective layer including an inclined portion extending in a direction that is not parallel to the plate.

2. The clothes treating apparatus of claim 1, wherein the inclined portion is inclined so that at least a portion of a surface of the inclined portion facing the color layer faces upward of the door.

3. The clothes treating apparatus of claim 1, wherein at least a portion of the inclined portion is at an upper portion of the door and is inclined so that at least a portion of a surface of the inclined portion facing the color layer faces upward of the door.

4. The clothes treating apparatus of claim 3, wherein another portion of the inclined portion is at a lower portion of the door and is inclined so that a portion of the surface of another portion of the inclined portion facing the color layer faces upward of the door.

5. The clothes treating apparatus of claim 2, wherein the inclined portion is inclined so that another portion of the surface of the inclined portion facing the color layer faces downward of the door.

6. The clothes treating apparatus of claim 2, wherein the inclined portion includes a first inclined portion, and a second inclined portion along an outer circumference of the first inclined portion,
wherein the second inclined portion extends from an end of the first inclined portion in a different direction from the first inclined portion, and extends in a direction that is not parallel to the plate.

7. The clothes treating apparatus of claim 1, wherein the inclined portion includes an inclined surface having a constant inclination angle.

8. The clothes treating apparatus of claim 1, wherein the inclined portion includes a curved inclined surface.

9. The clothes treating apparatus of claim 1, wherein the pattern layer includes a pattern region in which the optical pattern is formed.

10. The clothes treating apparatus of claim 9, wherein an inner edge of the pattern region is closer than an inner edge of the inclined portion to an outer edge of the door.

11. The clothes treating apparatus of claim 9, wherein the color layer is between the pattern region and the inclined portion so as to be in front of the inclined portion.

12. The clothes treating apparatus of claim 9, wherein the pattern region is along an outer edge of the pattern layer.

13. The clothes treating apparatus of claim 9, wherein the optical pattern includes a plurality of holes formed in the pattern region.

14. The clothes treating apparatus of claim 1, wherein the color layer is parallel to the pattern layer, and the clothes treating apparatus further comprises: a separation space between the inclined portion and the color layer.

15. The clothes treating apparatus of claim 1, wherein the inclined portion is along an outer edge of the door in a substantially annular shape.

* * * * *